US011132319B2

(12) United States Patent
Ngau et al.

(10) Patent No.: US 11,132,319 B2
(45) Date of Patent: Sep. 28, 2021

(54) TIMER CONTROL FOR PERIPHERAL COMPONENT INTERCONNECT EXPRESS COMPONENTS IMPLEMENTED WITH THUNDERBOLT CONTROLLERS

(71) Applicant: Intel Corporation, Santa Clara, CA (US)

(72) Inventors: Christopher Wing Hong Ngau, Penang (MY); Hooi Kar Loo, Penang (MY); Poh Thiam Teoh, Penang (MY); Shashitheren Kerisnan, Penang (MY); Maxim Dan, Hafia (IL); Chee Siang Chow, Pulau Pinang (MY)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 15/870,679

(22) Filed: Jan. 12, 2018

(65) Prior Publication Data
US 2019/0042510 A1    Feb. 7, 2019

(51) Int. Cl.
*G06F 1/3234* (2019.01)
*G06F 13/38* (2006.01)
*G06F 13/40* (2006.01)
*H04B 10/27* (2013.01)
*G06F 13/42* (2006.01)

(52) U.S. Cl.
CPC ...... *G06F 13/4022* (2013.01); *G06F 13/4027* (2013.01); *G06F 13/4282* (2013.01); *H04B 10/27* (2013.01)

(58) Field of Classification Search
None
See application file for complete search history.

(56) References Cited

U.S. PATENT DOCUMENTS

| | | | |
|---|---|---|---|
| 8,976,799 B1 | 3/2015 | Baker et al. | |
| 2012/0284434 A1* | 11/2012 | Warren | G06F 13/00 710/22 |
| 2013/0205053 A1* | 8/2013 | Harriman | G06F 13/4022 710/105 |
| 2014/0181354 A1* | 6/2014 | Yi | G06F 13/4022 710/313 |
| 2014/0195830 A1* | 7/2014 | Chin | G06F 1/3243 713/320 |
| 2017/0269675 A1* | 9/2017 | Klacar | G06F 13/102 |
| 2017/0364136 A1* | 12/2017 | Nandha Premnath | G06F 9/5027 |

(Continued)

*Primary Examiner* — Hyun Nam
(74) *Attorney, Agent, or Firm* — Alliance IP, LLC

(57) ABSTRACT

Aspects of the embodiments are directed to systems, methods, and devices for controlling power management entry. A PCIe root port controller can be configured to receive, at a downstream port of the root port controller, from an upstream switch port, a first power management entry request; reject the first power management entry request; transmit a negative acknowledgement message to the upstream switch port; initiate a timer for at least 20 microseconds; during the 20 microseconds, ignore any power management entry requests received from the upstream switch port; receive, after the expiration of the 20 microseconds, a subsequent power management entry request; accept the subsequent power management entry request; and transmit an acknowledgement of the acceptance of the subsequent power management entry request to the upstream switch port.

25 Claims, 13 Drawing Sheets

(56) References Cited

U.S. PATENT DOCUMENTS

2019/0041936 A1\* 2/2019 Teoh .................... G06F 13/4282
2020/0310517 A1\* 10/2020 Li ......................... G06F 1/3253

\* cited by examiner

TIMER CONTROL FOR PERIPHERAL COMPONENT INTERCONNECT EXPRESS COMPONENTS IMPLEMENTED WITH THUNDERBOLT CONTROLLERS

FIELD

This disclosure pertains to computing systems, and in particular (but not exclusively) to computing systems that incorporate Peripheral Component Interconnect Express (PCIe) protocols.

BACKGROUND

A Thunderbolt (TBT) interface can provide a PCIe tunnel within a serial data interface. During operation, a PCIe stream can be packetized into TBT packets for transport. The packets can be interleaved with other data packets, such as display packets, for transmission over a shared TBT connection, and then de-interleaved into their respective constituent streams at the receiver. Since neither PCIe nor other interleaved data streams are modified in transit, the resulting streams are natively compatible with existing PCI Express and DisplayPort hardware and software.

Within the context of data networking, a "tunnel" is a network communications channel between networked elements that embeds a network protocol (that is shared by the networked elements) within a transit protocol (which is native to the transit or bearer network). Tunneling is commonly used to logically connect sub-networks that cannot be physically combined. For example, private networks can establish secure tunnels through a public network to create a shared virtual private network. Tunneling can also be used to embed several network protocols over a common transport. For example, the incipient Thunderbolt™ high speed data bus can support PCI-Express (Peripheral Component Interconnect Express) and DisplayPort™ data simultaneously over a single, cost effective interface.

DETAILED DESCRIPTION

Figure 1:
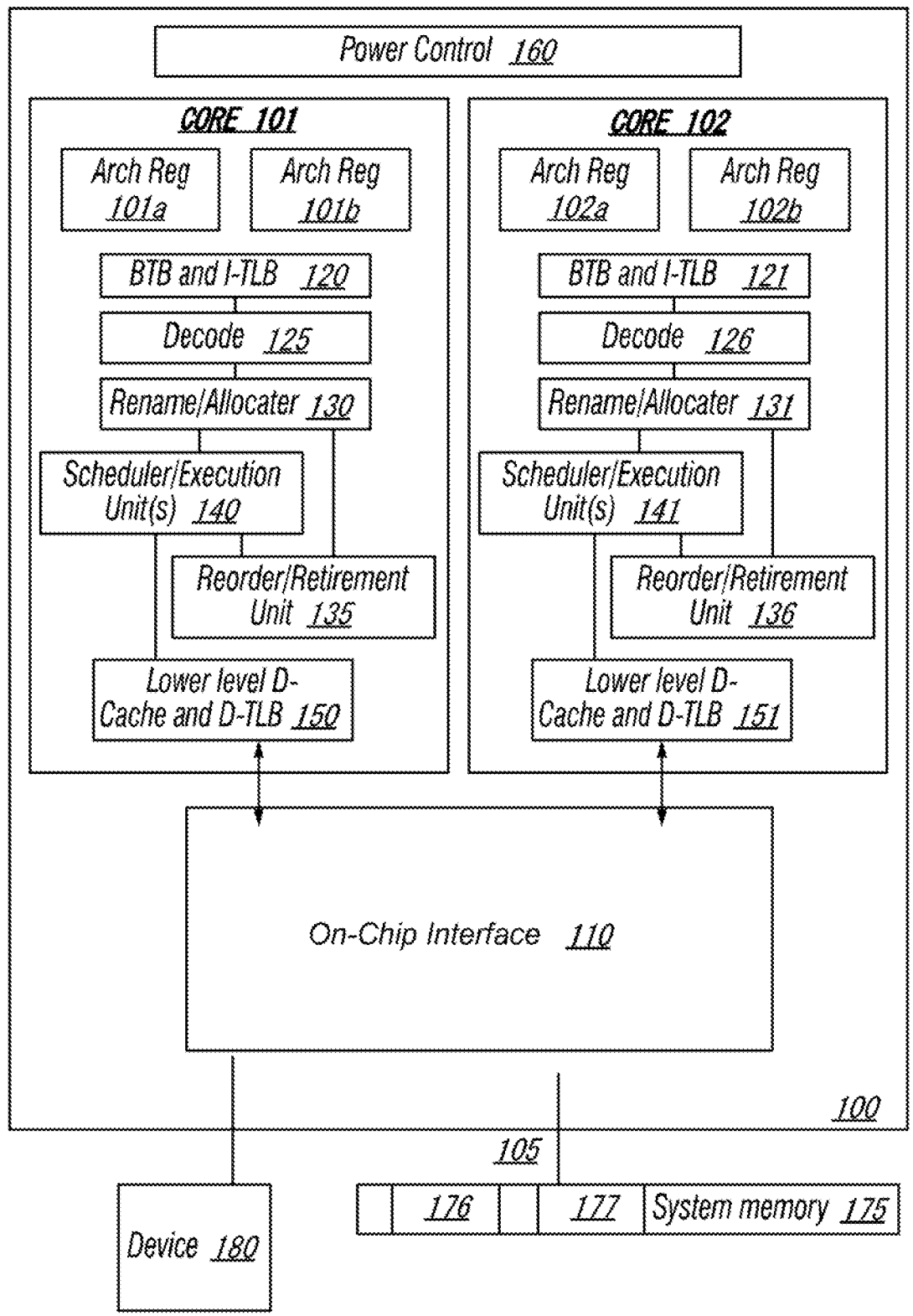
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™ And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

FIG. 1

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/ resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Part I

Peripheral Component Interconnect Express (PCIe) tunneling over the Converged I/O (CIO) Link is a feature in the upcoming generation of the Thunderbolt (TBT) technology. As a technology that supports multiple interconnect protocols, the TBT implements a packet throttling capability to arbitrate the bandwidth utilization of the CIO link. The packet throttling capability of the TBT is not native to the PCIe and could disrupt the handshake mechanisms between both Upstream and downstream ports defined in the PCIe Base Specification. The PCIe L1 Active State Power Management (ASPM) is one of the mechanisms impacted by the packet throttling capability.

Active State Power Management (ASPM) is a power management protocol used to manage PCIe-based serial link devices as links become less active over time. Among the power modes of the ASPM is an L1 power mode. The L1 mode is bidirectional and results in greater power reductions though with the penalty of greater exit latency.

ASPM is a hardware-autonomous active state mechanism that provides dynamic power saving in PCIe components by permitting a fully-on idling port of a downstream component (in D0 state) to autonomously negotiate an L1 entry request to place the link into a lower power state without software intervention. The PCIe Base Specification enforces a determined L1 timer value of 10 ?s for any L1 entry re-negotiation due to a request rejection. The L1 timer enforced value can be unintentionally violated in TBT sub-systems that implement packet throttling where the packet containing the rejection message transmitted from the PCIe upstream component is held by an intermediate component for too long while the PCIe downstream component continues to negotiate, being unaware that the negotiation had been rejected. Eventually, the PCIe downstream component will receive conflicting negotiation outcomes when the intermediate component releases the held packet and the PCIe ports on both ends go out-of-sync.

This disclosure addresses the ASPM L1 entry handshake issue caused by the packet throttling of an (integrated) Thunderbolt host controller. This disclosure describes recalibrated L1 timer values for the PCIe root port controller downstream and the upstream port of the PCIe switch residing in the Thunderbolt device. Out-of-sync PCIe ports leading to the degradation of hardware-autonomous power management mechanism will be frequently observed if the L1 timer values from the PCIe Base Specification are not replaced with the recalibrated values.

The out-of-sync port issue arises when the downstream port is unable to distinguish between the L1 entry requests from before the L1 NACK timer has timed out and the L1 entry request after for a proper ASPM negotiation termination. For the downstream port to distinguish the L1 request entries, the PCIe specification L1 values can be increased to compensate for the dynamic latency from the transmit throttling.

Aspects of the embodiments of this disclosure are directed to two recalibrated L1 timer values. The two recalibrated L1 timer values can facilitate safe windows for L1 request sampling and entry re-requests for both downstream and upstream ports in an active state power management (ASPM) L1 entry negotiation re-attempt following a rejected negotiation for a system that implements PCIe packet throttling. The recalibrated values account for the static and dynamic latencies introduced by an (e.g., Integrated) Thunderbolt host controller.

Aspects of the embodiments can increase the quality and reliability of a hardware-autonomous power management service of the PCIe components in Thunderbolt Sub-Systems that implement PCIe packet throttling. The recalibrated L1 timer values eliminate unexpected low power state entry failures resulting from the packet throttling for a rejected L1 entry negotiation scenario. Improved power savings can be observed with the recalibrated timer values as opposed to using the values from the PCIe Base Specification.

Figure 2:
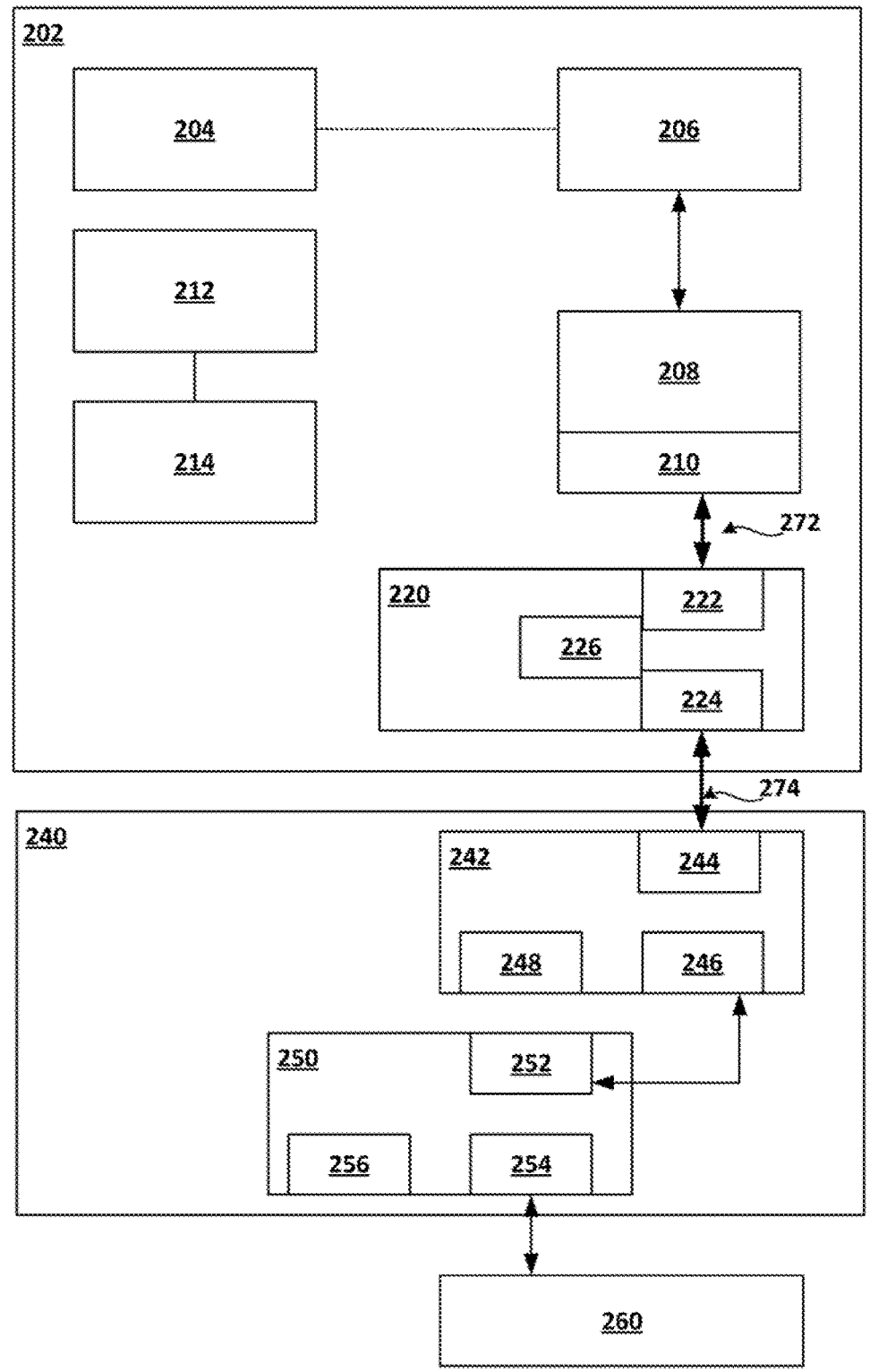
FIG. 2 is a schematic diagram of an example Peripheral Component Interconnect Express (PCIe) Thunderbolt (TBT) topology including an integrated TBT host controller in accordance with embodiments of the present disclosure.

FIG. 2 is a schematic diagram of a Peripheral Component Interconnect Express (PCIe) Thunderbolt (TBT) topology 200 including an integrated TBT host controller in accordance with embodiments of the present disclosure. The topology 200 includes a core unit 202. Core unit 202 can include a central processing unit (CPU) and/or platform controller hub (PCH). The core unit 202 can include a PCIe root port controller 208 that includes a PHY logical interface 210 to external devices. The PCIe root port controller 208 can be coupled to a primary scalable fabric interface 206, which interconnects the PCIe root port controller 208 with the CPU's direct memory access (DMA) 204. The core unit 202 can also include an integrated graphics subsystem 212 which is coupled to a display output 214, such as a display-Port.

In the topology 200 illustrated in FIG. 2A, a TBT host controller 220 is implemented as an integrated component to the core unit 202. The TBT host controller 220 can include a TBT switch 226 that includes a PCIe adapter (PA) 222 that can interface with the PCIe root port 208 across a TBT PIPE interconnect 272. The TBT switch 226 can include a null adapter (NA) 224 to interface across a CIO link 274 with an NA 244 on a TBT device 240.

The TBT device 240 can include a TBT switch 242 that houses the NA 244 for interfacing with the TBT switch 230 across the CIO link 244. The TBT switch 230 can include a PA 246 for interfacing with a PCIe switch 250 in the TBT device 240. The PA 246 can interface with the PCIe switch through a USP 252. The PCI switch can interface with a PCIe device 260 across a DSP 256 on the PCIe switch 250.

The TBT host controller 220 can include PCIe switch ports (e.g., USP 224) to interface with the I/O of the high speed integrated controllers in the core unit 202. This would depict the TBT host controller 220 as a native PCIe device from the PCIe root port controller 208 point-of-view.

The integrated TBT host controller 220 makes use of PCIe tunneling over the CIO link 274. The PCIe root port controller 208 no longer uses a PHY for serial transmission but can interface directly to the PCIe Adapter (PA) 222 of the TBT host controller 220 through a standard TBT PIPE (PHY Interface for PCI Express) 272. The TBT host controller 220 can encapsulate PCIe packets into CIO packets and "tunneled" over the CIO link 272. The PA 222 has the capability to throttle the packets from the PCIe root port controller 208 under circumstances where a higher priority protocol such as a display needs to utilize the bandwidth of the CIO link 274. With the integrated TBT host controller 220 and the packet throttling capability, the time taken for both PCIe ends (e.g., from PCIe root port controller 208 to the PCIe device 260) to communicate can be extended statically and dynamically. This time latency creates an issue concerning the Active State Power Management (ASPM) L1. The issue involves both the integrated PCIe root port controller 208 and the upstream switch port (USP) 252 of the TBT device 240, where the pCIe ports can go out-of-sync whenever there is a long dynamic PCIe packet throttling period occurring in parallel with a L1 negotiation rejection.

Figure 3:
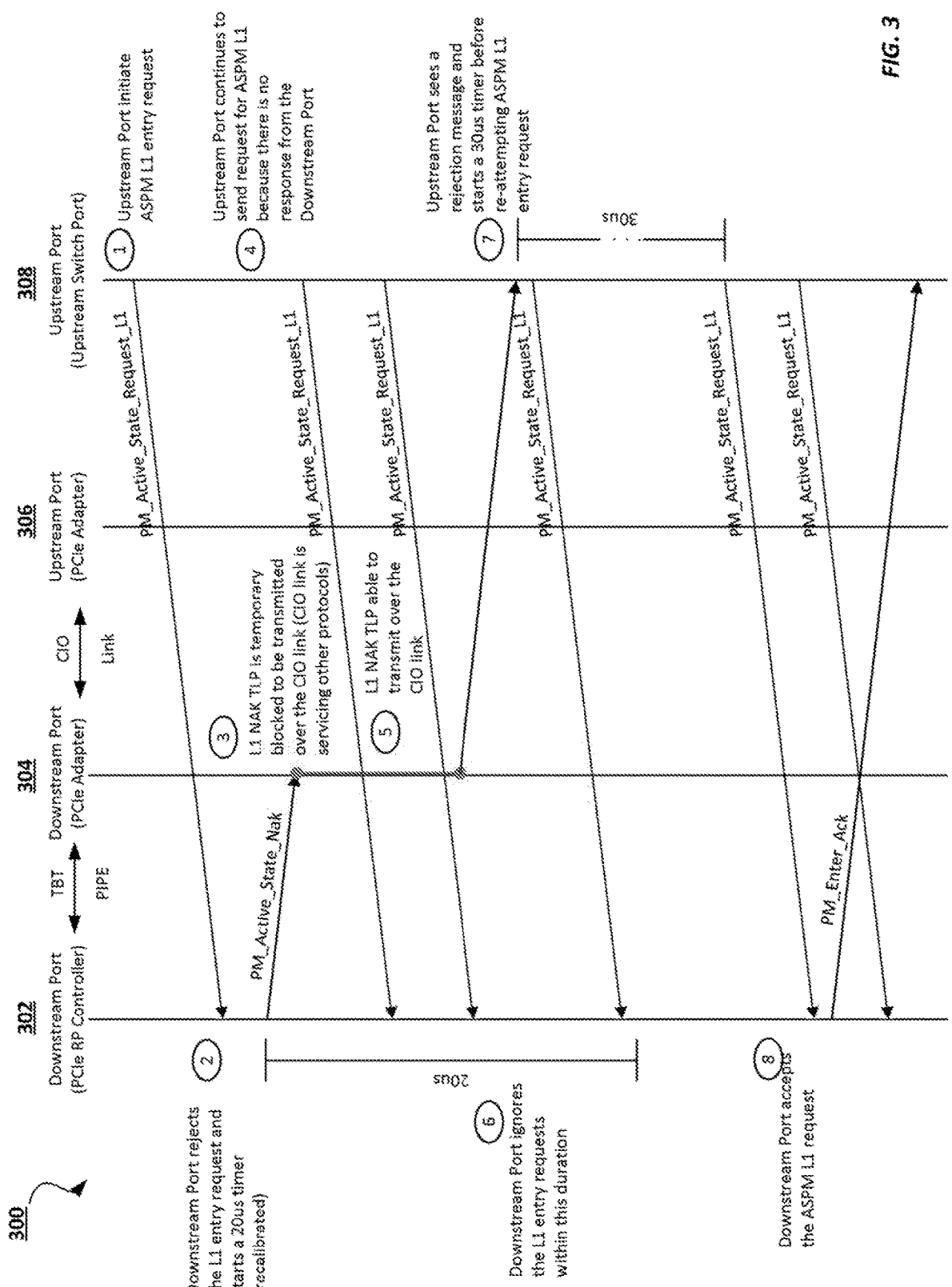
FIG. 3 is a swim lane diagram illustrating the use of reconfigured retimers in accordance with embodiments of the present disclosure.

FIG. 3 is a swim lane diagram 300 illustrating the use of reconfigured retimers in accordance with embodiments of the present disclosure. At the outset, an upstream switch port 308 can initiate an ASPM L1 entry request by transmitting a PM_Active_State_Request_L1 message to a downstream port (e.g., of the PCIe root port controller) 302 after a period of idle link time (1). The downstream port 302 in some instances may be unable to service the entry request and so the downstream port rejects the ASPM L1 entry request by responding with a PM_Active_State_Nack transaction layer packet (TLP). As opposed to the 10 μs timer consistent with the PCIe Base Specification, the downstream port 302 can start a 20 μs timer after transmitting the PM_Active_State_Nack TLP to a downstream port PCIe adapter 304 of a TBT host controller over the TBT PIPE (2). The 20 μs timer is to allow the current ASPM L1 request to complete before sampling a new Link Power Management entry request. The downstream port can activate the 20 μs timer when the link is in the L0 state. The timer can hold when the link is in a recovery state. The timer can reset if the link goes down and back up again.

In some instances, the PM_Active_State_Nack TLP, however, can be stalled inside the downstream port PCIe adapter 304 due to the CIO link servicing other protocols (3). The upstream switch port 308 can continue to transmit the ASPM L1 entry request to the downstream port 302 as the upstream switch port 308 has yet to receive an ACK or NACK response (4).

The PM_Active_State_Nack TLP could potentially be stalled in the downstream port PCIe adapter for as long as 10 μs before it is able to be transmitted over the CIO link to an upstream port PCIe adapter 306 (5). The upstream switch port 308, however, may have transmitted subsequent PM_Active_State_Request_L1 messages during the 10 μs latency.

The previously used 10 μs timer at the downstream port would have timed out if the PM_Active_State_Nack TLP is stalled up to 10 μs. The downstream port in this condition would then start to sample any link Power Management request on its receiver. The downstream port would then sample the initial on-going L1 entry request from the upstream port and treat the request as a new ASPM L1 entry request. The downstream port would then start to service the ASPM L1 entry request and transmit a PM_Enter_Ack to the upstream port. The upstream port on the other hand had not scheduled another ASPM L1 entry will see a rejection message and subsequently an acknowledgement to enter L1 from the downstream port. The downstream port views the ASPM negotiation as successful; hence, will enter into L1 state and waits for electrical idle on its Receivers. Meanwhile, the upstream port views the negotiation as rejected and transitions back to L0 but sees a spurious PM_Enter_Ack. This condition will cause both Downstream and upstream ports to be out-of-sync.

By using a 20 μs timer, the downstream port 302 can ignore PM_Active_State_Request_L1 requests received during the pendency of the 20 μs timer (6). This pendency allows for the stalled PM_Active_State_Nack TLP at the downstream port PCIe adapter 304 to be transmitted to the upstream switch port 308. The upstream port 308 processes the received PM_Active_State_Nack TLP.

In embodiments, the upstream port 308 can wait for at least 30 μs from the last transmission of the PM_Active_State_Request_L1 DLLP prior to transmitting a PM_Active_State_Request_L1 DLLP associated with a subsequent ASPM L1 negotiation sequence (7). For example, the subsequent ASPM L1 negotiation can be undergone due to the upstream port 308 receiving the PM_Active_State_Nack TLP. This 30 μs timer can activate when the link is in L0 state. The timer can hold when the link is in recovery state. If the link goes down and comes back up, the timer is ignored and the upstream port 308 is permitted to issue a new ASPM L1 request after the link is up.

For PM_Active_State_Request_L1 DLLP messages received after the expiration of the 20 μs timer at the downstream port 302, the downstream port 302 accepts the ASPM L1 request and issues a PM_Enter_Ack message to the upstream port 308.

Figure 4A:
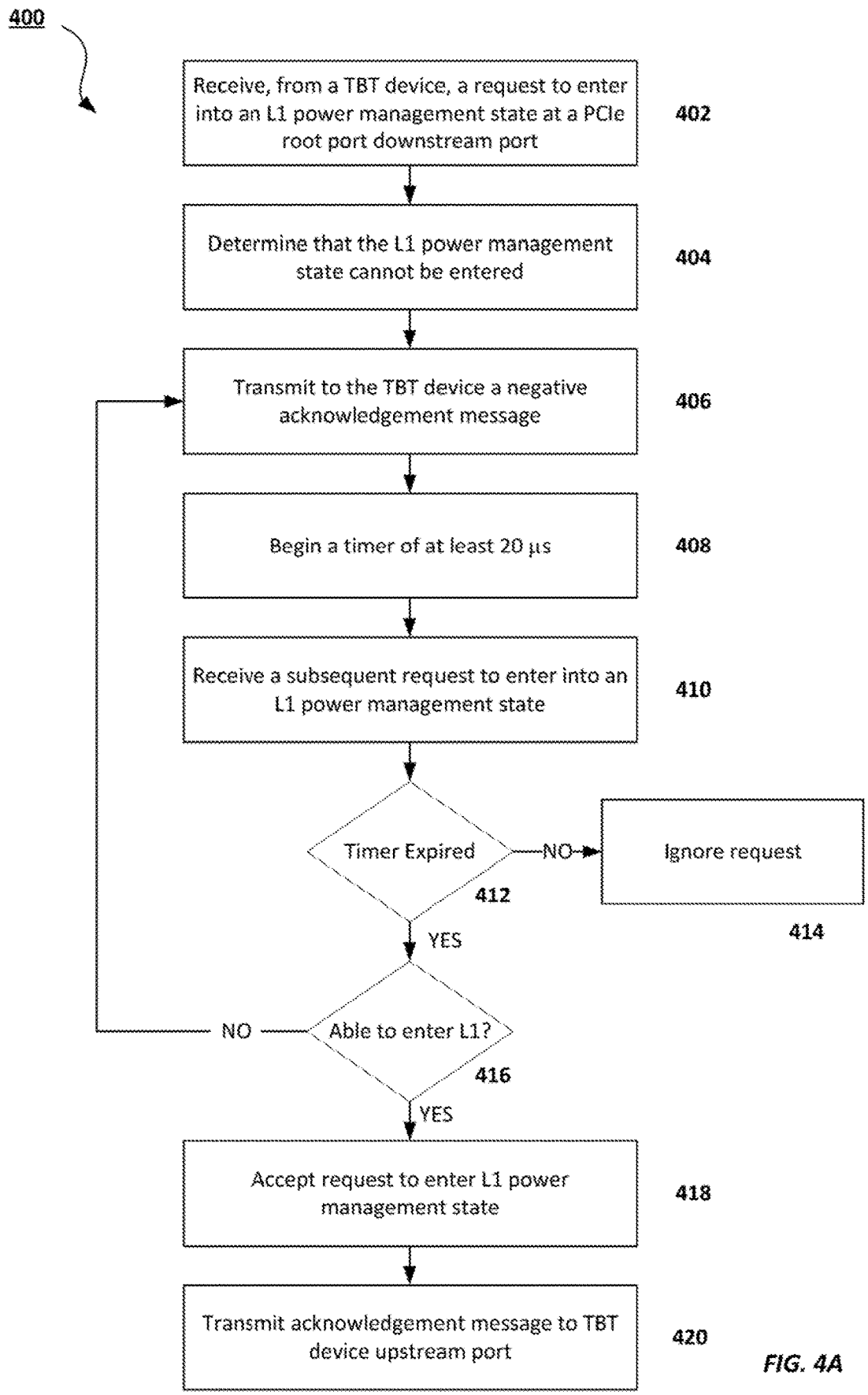
FIG. 4A is a process flow diagram for processing received power management entry requests in accordance with embodiments of the present disclosure.

FIG. 4A is a process flow diagram 400 for processing received power management entry requests at a root port controller in accordance with embodiments of the present disclosure. A PCIe root port controller downstream port can receive, from a TBT device, a request to enter into an L1 power management state at a PCIe root port downstream port (e.g., a PM_Active_State_Request_L1 DLLP) (402). The downstream port can determine that the L1 power management state cannot be entered (404). The downstream port can transmit to the TBT device a negative acknowledgement (e.g., a PM_Active_State_Nack TLP) (406). The root port downstream port can begin a timer of at least 20 μs (408).

The downstream port can receive a subsequent request to enter into an L1 power management state (410). The downstream port can ignore the received requests to enter the L1 power management state (414) if the timer has not expired (412). If the timer has expired (412), the downstream port can determine whether the L1 power management state can be entered (416). If the L1 power management state cannot be entered, then the downstream port can transmit a NACK to the TBT device upstream port (406). If the L1 power management state can be entered, then the downstream port can accept the request to enter the L1 power management state (418) and can transmit an acknowledgement message (e.g., a PM_Enter_ACK) to the TBT device upstream port (420).

Figure 4B:
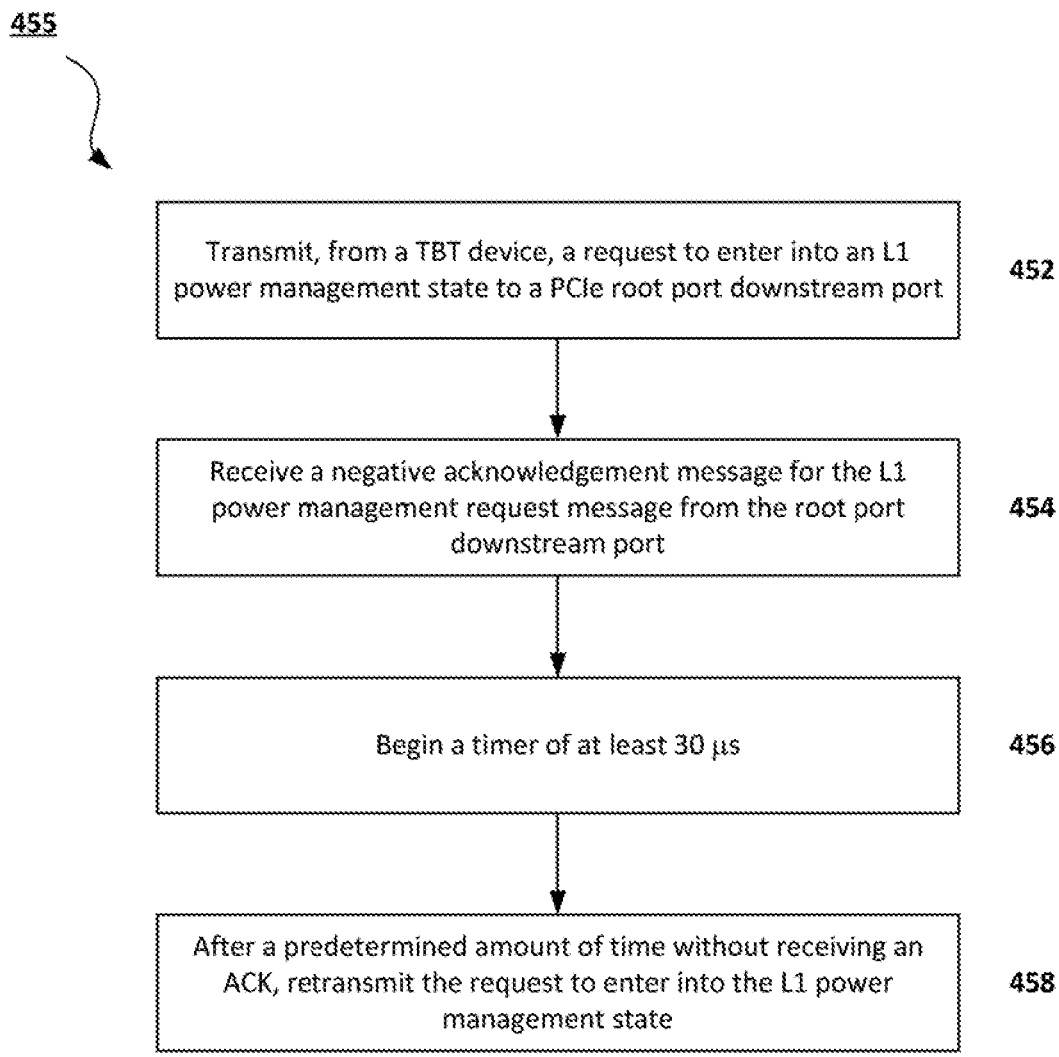
FIG. 4B is a process flow diagram for delaying retransmission of a power management entry request message in accordance with embodiments of the present disclosure.

FIG. 4B is a process flow diagram 450 for delaying retransmission of a power management entry request message in accordance with embodiments of the present disclosure. A TBT device can transmit, through an upstream port to a downstream port of a root port controller of a core unit, a request to enter into an L1 power management state (e.g., a PM_Active_State_Request_L1 DLLP) (452). The upstream port can receive a negative acknowledgement message (e.g., PM_Active_State_Nack TLP) for the L1 power management request message from the root port downstream port (454). In some embodiments, the upstream port can, before receiving the negative acknowledgement can retransmit the L1 power management state entry request messages. After receiving the negative acknowledgement message, the TBT device upstream port can begin a timer of at least 30 seconds (456). The upstream port can, after the expiration of the timer, transmit a new request message to enter the L1 power management state (458).

Part II

Figure 5:
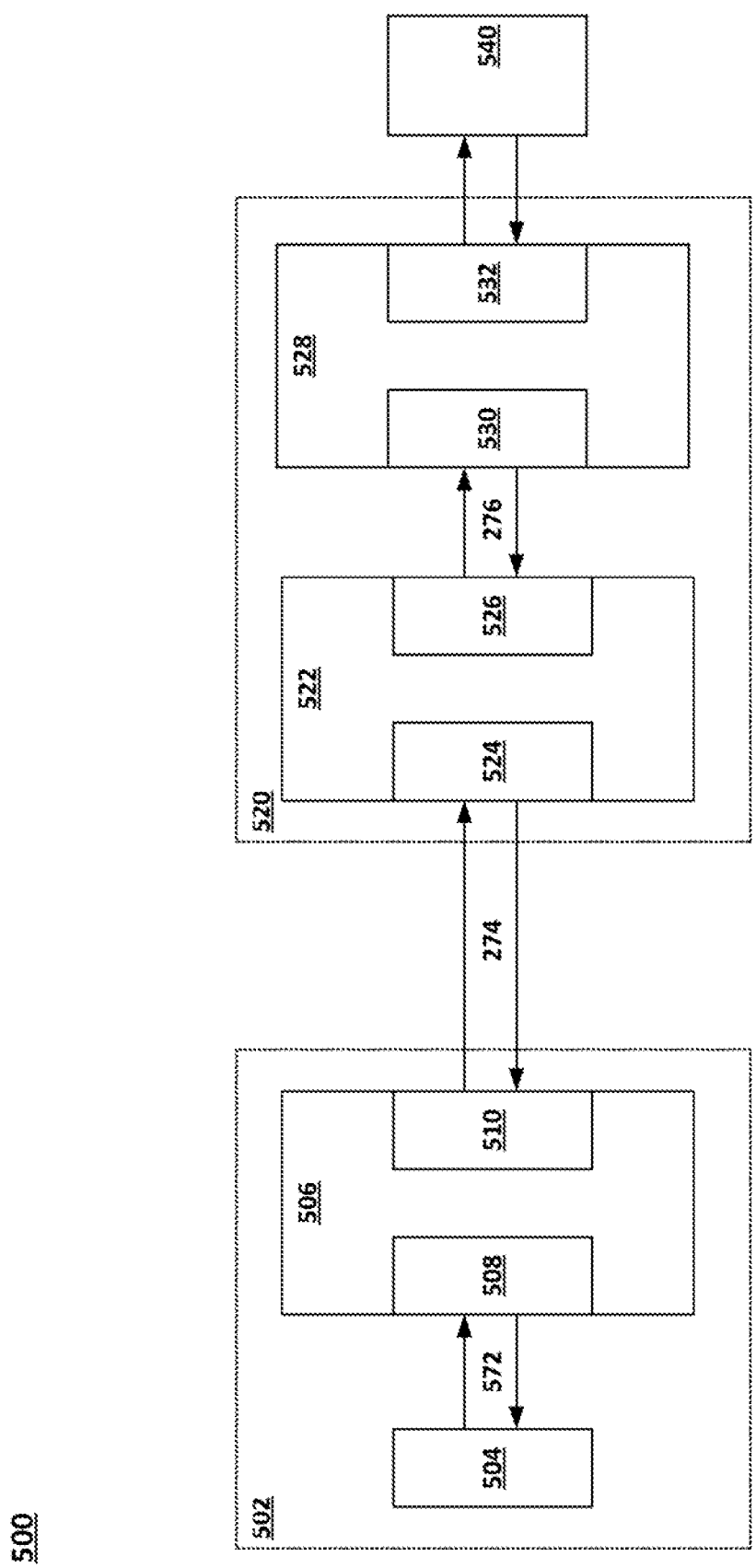
FIG. 5 is a schematic illustration of an example Peripheral Component Interconnect Express (PCIe) Thunderbolt (TBT) topology including an integrated TBT host controller in accordance with embodiments of the present disclosure.

FIG. 5 is a schematic diagram of an example Peripheral Component Interconnect Express (PCIe) Thunderbolt (TBT) topology 500 including an integrated TBT host controller in accordance with embodiments of the present disclosure. The PCIe TBT topology 500 is similar to that shown in FIG. 2. A core unit 502 can include an upstream PCIe component 502, which can be part of a PCIe root port controller. An integrated TBT host controller 506 can include a an upstream PCIe adapter (PA) 508 and a null adapter (NA) 510. The integrated TBT host controller 506 can be connected to the upstream PCIe component 504 by a TBT PHY Interface for a PCIe (PIPE) 572.

With an Integrated TBT Host Controller 506, the Integrated PCIe Component (Root Port Controller)504 interfaces with a PA 508 across a TBT PIPE. The PA 508 is located in the TBT Host Controller 506. The PA 508 serves as an intermediate component that receives incoming PCIe packets and holds them in a staging Transmit Queue until the Protocol Arbiter grants the PCIe-protocol the use of the CIO Link 274.

The integrated TBT host controller 506 can be connected to a TBT device 520 across a converged 10 (CIO) link 274. The TBT device 520 can include a TBT switch 522. The TBT switch can include a NA 524 coupled to the NA 510 of the integrated TBT host controller 506 by the CIO 274. The TBT switch 522 includes a downstream PCIe adapter (PA) 526. The TBT switch 522 can be coupled to a PCIe switch 528 by a TBT PIPE 276. The PCIe switch 528 can include an upstream PCIe switch port 530 and a downstream PCIe switch port 532. A PCIe device 540 can be connected to the TBT device by the downstream PCIe switch port 532.

Peripheral Component Interconnect Express (PCIe) tunneling over a Converged Input/Output (CIO) link is a salient feature of the Thunderbolt (TBT) technology. PCIe tunneling allows external PCIe devices to be connected to a central processing unit (CPU) or the Platform Controller Hub (PCH) through a CIO link. As the TBT supports multiple I/O protocols, an arbitration can be used to determine which protocol is allowed to use the CIO Link at a given time. Packets for protocols that are unable to acquire the use of the link are throttled with a packet throttling mechanism until the arbiter grants the use of the link.

Due to packet throttling, a dynamic latency is introduced as the packets are throttled after leaving the PCIe egress port, thereby impacting the PCIe timer timeout values defined in the PCIe Base Specification. One example timer impacted is the Data Link Layer replay timer. The dynamic latency can cause the acknowledgement (ACK) from the receiving PCIe component to arrive at the transmitting PCIe component at a time later than scheduled or anticipated. Due to this latency, the replay timer on the transmitting PCIe component can timeout, and the replay timer can initiate a TLP replay before the ACK arrives. The spurious replays produce redundant TLP packets, which can impact the communication effectiveness of the entire PCIe path. In addition, streaming TLPs while the packet throttling mechanism is active can cause the staging transmit queue in the intermediate PCIe Adapter (PA) to overflow. The overflow will result in packet losses and replays will need to be initiated in order to make forward progress.

The PCIe upstream component 502 starts the replay timer when the TLP packet is transmitted on the TBT PIPE interface. However, the Integrated TBT Host Controller 506 could be servicing another priority protocol, causing the CIO Link 574 to be unavailable to the PCIe protocol. The TLP packets on the TBT PIPE 572 will be temporary held in the PA staging transmit (TX) queue, awaiting for the bandwidth to be granted on the next arbitration. The packet throttling mechanism could cause the TLP packets to be held up to 10 ⊠ s. This causes two quality-of-service (QoS) issues to the transmitting PCIe Component.

The first QoS issue relates to the replay timer timeouts when no acknowledgement is returned for the TLPs that was sent during the period where the packet throttling mechanism is in effect. Once a TLP leaves the PCIe egress port, the replay timer counter will start incrementing towards the time out value specified in the PCIe Base Specification. Under heavy CIO Link bandwidth utilization by non-PCIe protocols, the dynamic latency introduced by the packet throttling mechanism could reach a maximum value of 10 ⊠ s. With the dynamic latency added to the already increased static latency caused by the Integrated TBT Host Controller 506, the transmitting PCIe Component 504 will only see an acknowledgment from the receiving PCIe Component 540 after 10 ⊠ s from the time the transmitting PCIe component started to transmit the first TLP packet from a no-outstanding TLP in Retry Buffer condition. With the PCIe Base Specification replay timer time out values, the transmitting PCIe Component 504 would have initiated at least one spurious replay due to the replay timer timeout. The spurious replays would degrade the QoS of the PCIe communication. Addressing the issue by changing the time out value will not be effective as the dynamic latency varies accordingly with the CIO Link bandwidth utilization.

Secondly, the staging transmit queue in the PA 508 can quickly fill up if the PCIe Upstream Component 504 is streaming TLPs downstream when other non-PCIe protocol is utilizing the CIO Link 574. Without an indication to inform the transmitting PCIe Component 504 to stop transmitting, the PCIe packets will be dropped when the Transmit Queue overflows. Dropped packets would result in replays initiated and PCIe QoS can quickly degrade to extreme levels if higher priority non-PCIe protocols are constantly requesting for the CIO Link bandwidth.

With the two issues causing TLPs to be replayed frequently, the Retry Buffer in the transmitting PCIe Component 504 is resized to accommodate the incoming TLPs from the Transaction Layer. A large Retry Buffer would incur a huge gate count penalty and will be underutilized when CIO Link 574 is running on light loads.

This disclosure describes a TBT PHY Interface for a PCIe (PIPE) halt indication signal that allows the transmitting PCIe component 504 to handle the dynamically introduced latency in the transmit path and to avoid potential packet losses due to the packet throttling mechanism. The halt indication signal can limit or eliminate frequent and spurious replays as well as allowing the Retry Buffer to be optimized fully as part of the gate-count reduction initiative to reduce the silicon die area.

The disclosure introduces the halt indication signal to the Data Link Layer in the PCIe Component 504 whereby the replay timer count increment is paused and the packet transmission is halted when the halt indication signal is asserted, and resumes normal operation when de-asserted. The halt indication signal is asserted whenever the Integrated TBT Host Controller 506 is servicing protocols other than the PCIe protocol. The halt indication signal provides a way for the Data Link Layer of the PCIe Component 504 to know that the TLP transmitted on its egress port is stalled in the PA 508 due to the packet throttling mechanism and the packet acknowledgment from the destination PCIe Component 540 could be delayed; hence, the transmitting PCIe Component 504 should not initiate a spurious TLP replay.

The disclosure uses a single bit interface to prevent spurious TLP replays from occurring in the systems that implement packet throttling and without having to extrapolate the Retry Buffer queues. Latency between subsequent accepted TLP packets with unique sequence numbers will be improved as spurious TLP replays arising from throttled packets are eliminated with the Halt indication signal. The limiting or elimination of spurious TLP replays permits an optimized Retry Buffer design that translates to gate-count savings; where this could be beneficial to systems on chip (SoCs) with tight structural design requirements on die-size area.

As mentioned previously, to arbitrate multiple protocols, the integrated TBT host controller 506 would need to implement a packet throttling mechanism to temporary hold off packets from one protocol in order to service another. Once the PCIe packets are throttled in the PA 508, when a non-PCIe protocol is been serviced, a dynamic latency is added to the already increased static latency in the transmit data path due to the topological structure of the Integrated TBT host controller 506. From the transmitting PCIe Component 504 perspective, it is unaware of the new latency incurred nor have the knowledge that its packets are throttled in the PA; therefore, the transmitting PCIe component 504 assumes a normal PCIe operation with expectations outlined in the PCIe Base Specification.

A TBT PIPE halt indication signal is described to prevent spurious replays and improve Link efficiency for PCIe Components in sub-systems that implements the Integrated TBT host controller 506. The halt indication is generated from the PA 508 to the Data Link Layer of the PCIe Component 504 that is interfaced to the PA 508. The PCIe data path from the PA 508 to the TBT Device 540 is blocked whenever the Integrated TBT host controller 506 is servicing a higher priority non-PCIe protocol. When the CIO Link 574 is servicing a non-PCIe protocol, the PA is expected to assert the Halt indication signal.

Figure 6:
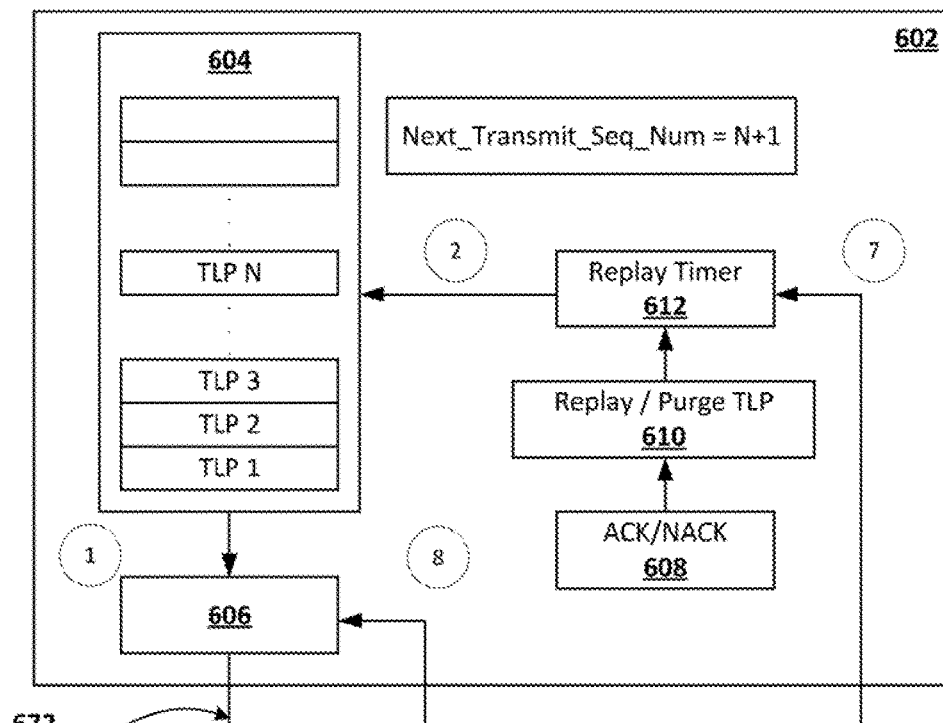
FIG. 6 is a logical flow diagram of a halt indication signal applied in a TBT host controller topology in accordance with embodiments of the present disclosure.
Figure 6:
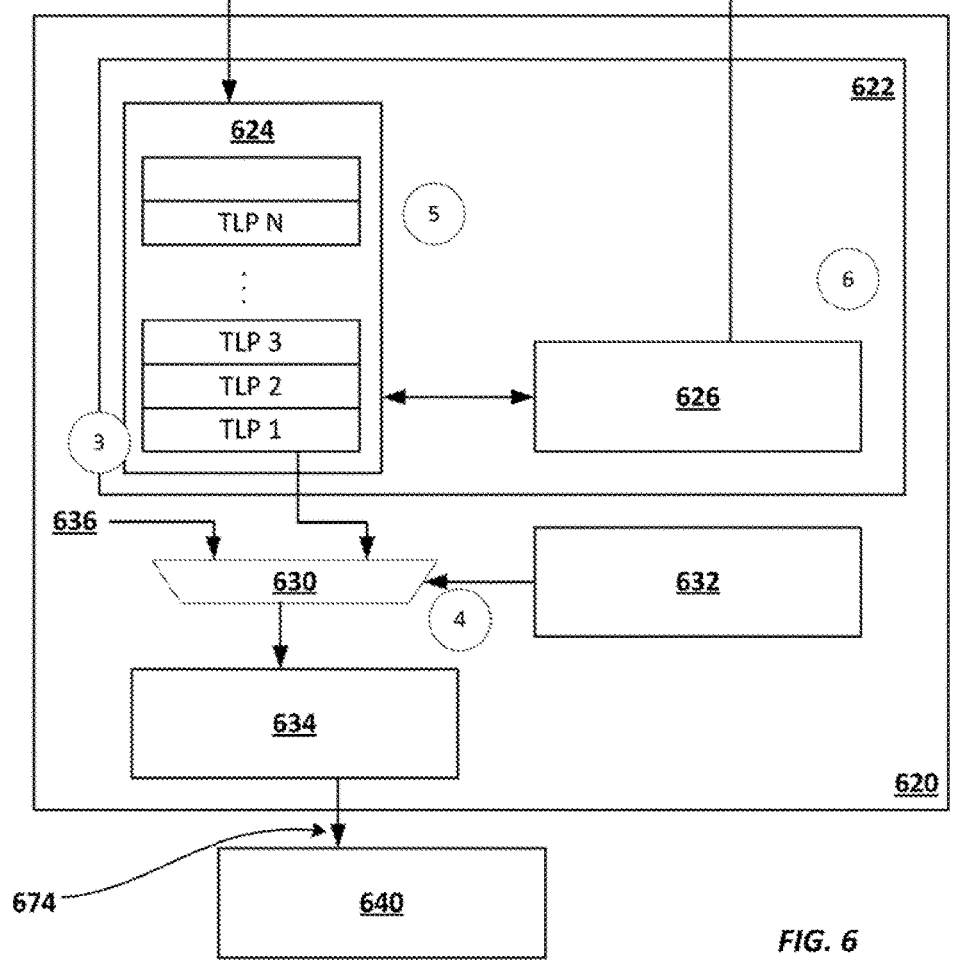

FIG. 6 is a logical diagram 600 of a TBT host controller topology applying a halt indication in accordance with embodiments of the present disclosure. FIG. 6 illustrates an example of a PCIe upstream component data link layer 602. The PCIe upstream component data link layer 602 can include a retry buffer 604 for buffering TLPs, such as TLP 1, 2, 3, . . . N . . . , etc. A transmit logic 606 can be responsible for transmitting TLPs to an integrated TBT host controller 620.

The PCIe upstream component data link layer 602 can include an ACK/NACK logic 608 coupled to a replay/purge TLP logic 610. The replay/purge TLP logic 610 can be coupled to a replay timer 612. Replay timer 612 can set a time limit after which a TLP can be retransmitted from the replay buffer 604.

The upstream component data link layer 602 can stream TLPs on a downstream port transmit logic 606 to the upstream PCIe adapter 622 at the integrated TBT host controller 620 (1). The replay timer starts counting after the first TLP (TLP1) has been transmitted across the TBT PIPE 672. The incoming TLPs begin to fill up the transmit (TX) queue 624 in the PCIe adapter 622. The TX queue 624 holds the TLPs before the TLPs are presented to the TBT logic to be encapsulated and transmitted over the CIO link 674 (3).

While the TX queue 624 is being populated with TLPs, a protocol arbiter logic 632 can grant the CIO link bandwidth to, e.g., a display 636 (4), which can cause a switch 630 to change the traffic to the display traffic, causing the PCIe path to be blocked to up to 10 ⌀s and for PCIe packets to be throttled.

As the packet throttling mechanism is in effect, the TX queue 624 can fill up (5). The first TLP remains in the TX queue 624 as the first TLP waits for other protocols to complete their respective transmissions across the CIO link 674.

When the TX queue begins to fill up, a halt indication logic 626 residing at the integrated TBT host controller 620 (e.g., in the PCIe adapter 622) can assert a halt indication signal to the PCIe upstream component data link layer 602 (6). The halt indication signal can indicate to the PCIe upstream component data link layer 602 that the PCIe packets are throttled at the PCIe adapter 622. The halt indication signal can pause the replay timer 612 to avoid spurious replays due to timeout as the receiving PCIe component has yet to see the TLPs (7). The halt indication signal also indicates to the transmit logic 606 to stop transmitting and not to accept additional TLPs from the Transaction Layer, since the TX queue 624 at the PCIe adapter 622 is full or nearly full, which avoid replays due to dropped packets.

The PCIe Component 602 with a TX port interfaced to the PA 622 will use the halt indication as a qualifier in the replay timer count incrementing logic: When the halt indication is asserted during the periodic clock tick sample, the replay timer must not increment the count. When the Halt indication is de-asserted, the replay timer must proceed with the count increment per the PCIe Base Specification. The halt indication will also indicate to the Data Link Layer transmit logic 606 in the PCIe Component to throttle its packet transmission and hold off any additional TLPs from the Transaction Layer when asserted. This hold-off is to avoid any possible packet loss in the condition when the TX queue 624 in the PA 622 is almost full. When de-asserted, the transmit logic 606 can resume normal operations and the Data Link Layer 602 can grant the incoming TLPs from the Transaction Layer as per design intention.

Figure 7A:
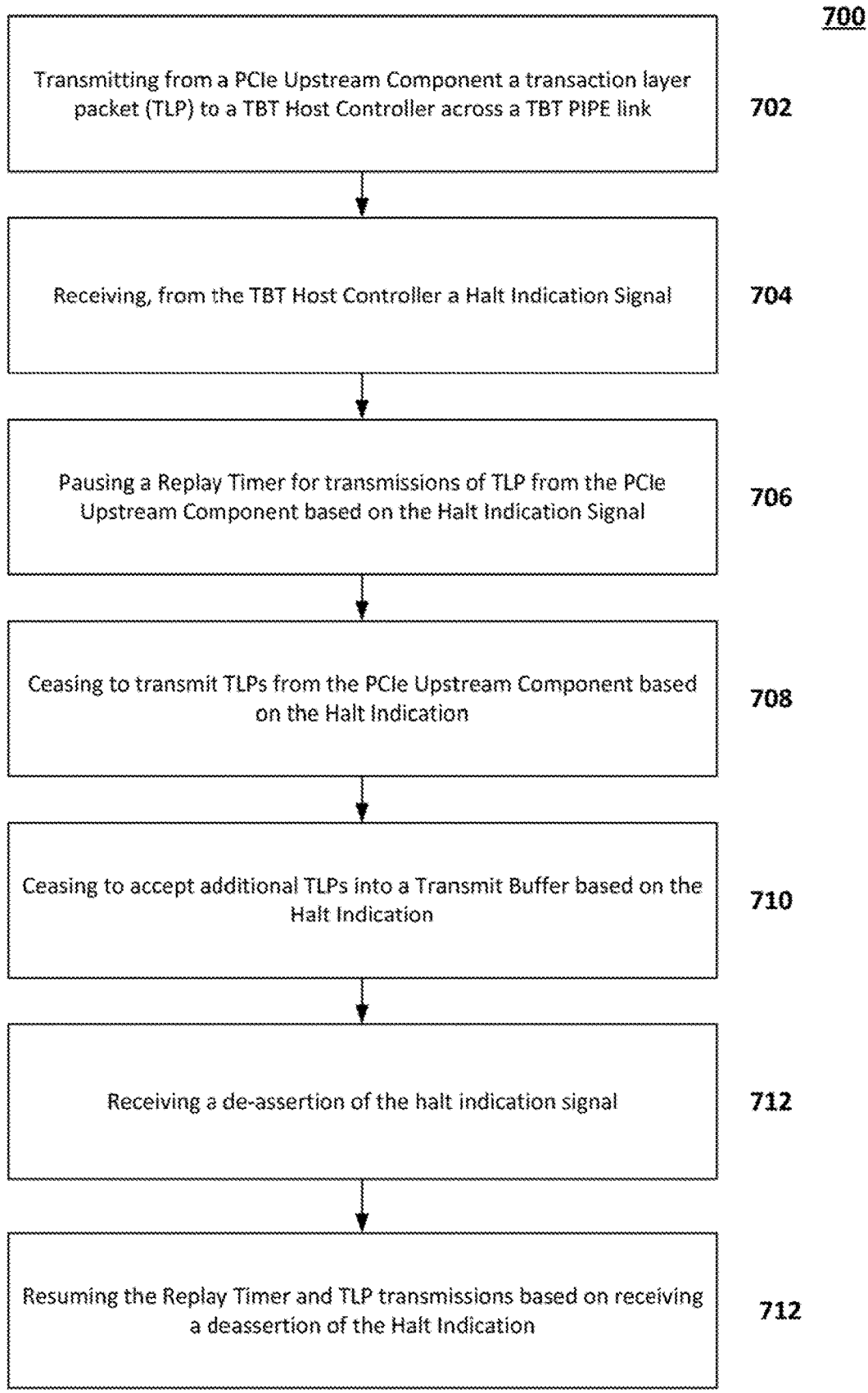
FIG. 7A is a process flow diagram for applying a halt indication in a TBT host controller topology in accordance with embodiments of the present disclosure.

FIG. 7A is a process flow diagram 700 for applying a halt indication in a Thunderbolt host controller topology in accordance with embodiments of the present disclosure. A PCIe upstream component data link layer can transmit one or more transaction layer packets (TLPs) to a TBT host controller across a TBT PIPE link (702). The PCIe upstream component data link layer can receive from the TBT host controller a halt indication signal indicating that a TX queue at PCIe adapter at the TBT host controller is full or nearly full (704). Based on receiving the halt indication, the upstream component data link layer can pause a replay timer for retransmissions of TLPs (706); the upstream component data link layer can cease transmitting TLPs to the PCIe adapter (708); and the upstream component data link layer can reject new TLPs from the transaction layer (710).

The upstream component data link layer can receive a de-assertion of the halt indication signal (712). Upon receiving the de-assertion of the halt indication signal, the upstream component data link layer can resume the replay timer and can resume receiving TLPs from the transaction layer for transmission to the TBT host controller (714).

Figure 7B:
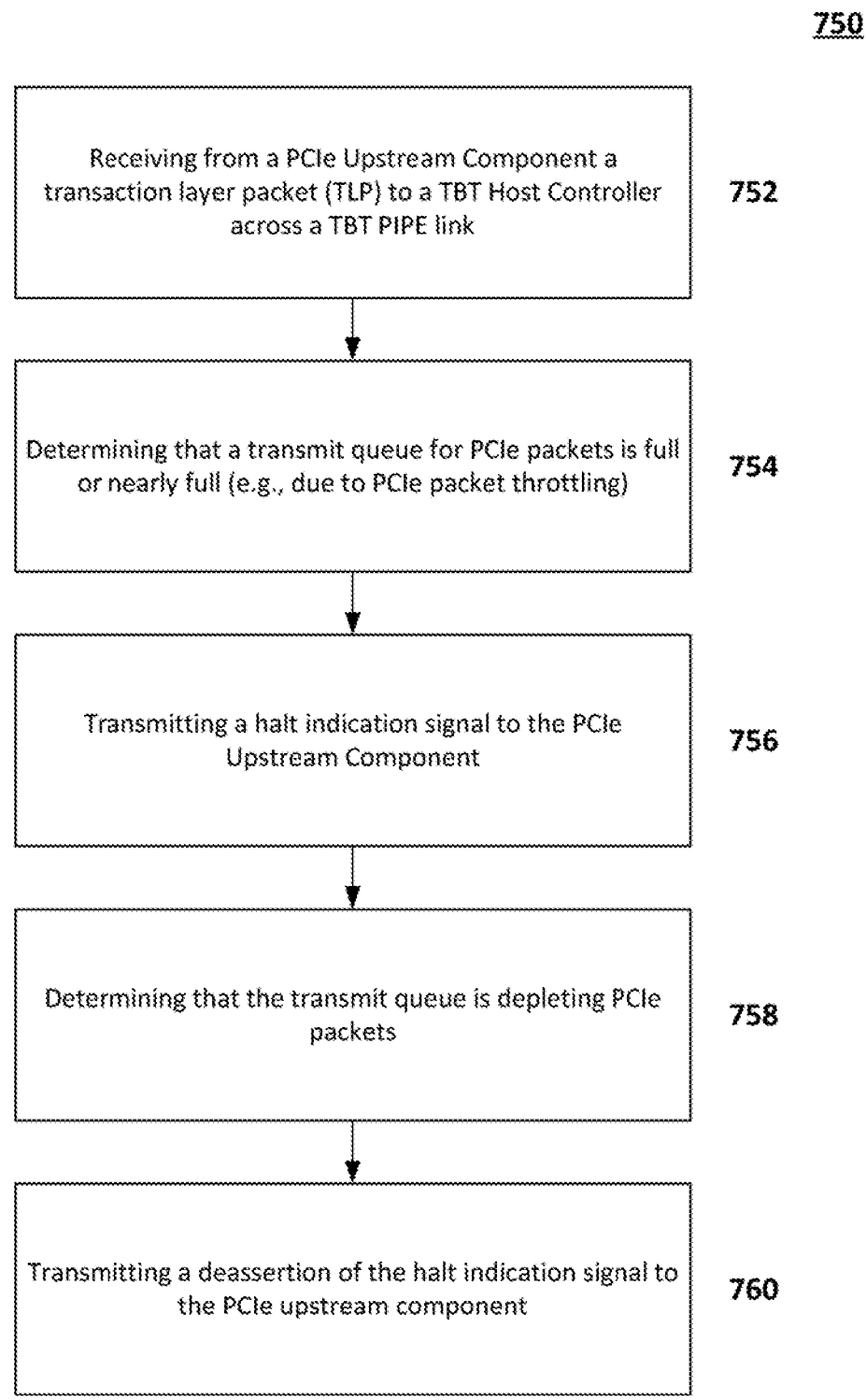
FIG. 7B is a process flow diagram for providing a halt indication signal to an upstream component from a TBT host controller in accordance with embodiments of the present disclosure.

FIG. 7B is a process flow diagram 750 for providing a halt indication signal to a PCIe upstream component data link layer from a TBT host controller in accordance with embodiments of the present disclosure. A TBT host controller PCIe adapter can receive, from a PCIe upstream component data link layer a transaction layer packet (TLP) and add the TLP to a transmit (TX) queue (752). The PCIe adapter can determine that the TX queue is full or nearly full (e.g., the TX queue includes a number of TLPs in excess of a threshold number of TLPs) (754). The TX queue can be full or nearly full due to a PCIe packet throttling event, such as a channel arbitration that elects a different protocol for transmission across a converged I/O.

A halt indication logic at the PCIe adapter can transmit to the PCIe upstream component data link layer a halt indication signal (756). When the TX queue includes a number of TLPs below a threshold level, the PCIe adapter can determine that the TX queue is depleting PCIe packets (758). The halt assertion logic can transmit a de-assertion of the halt indication to the PCIe upstream component data link layer (760).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 8:
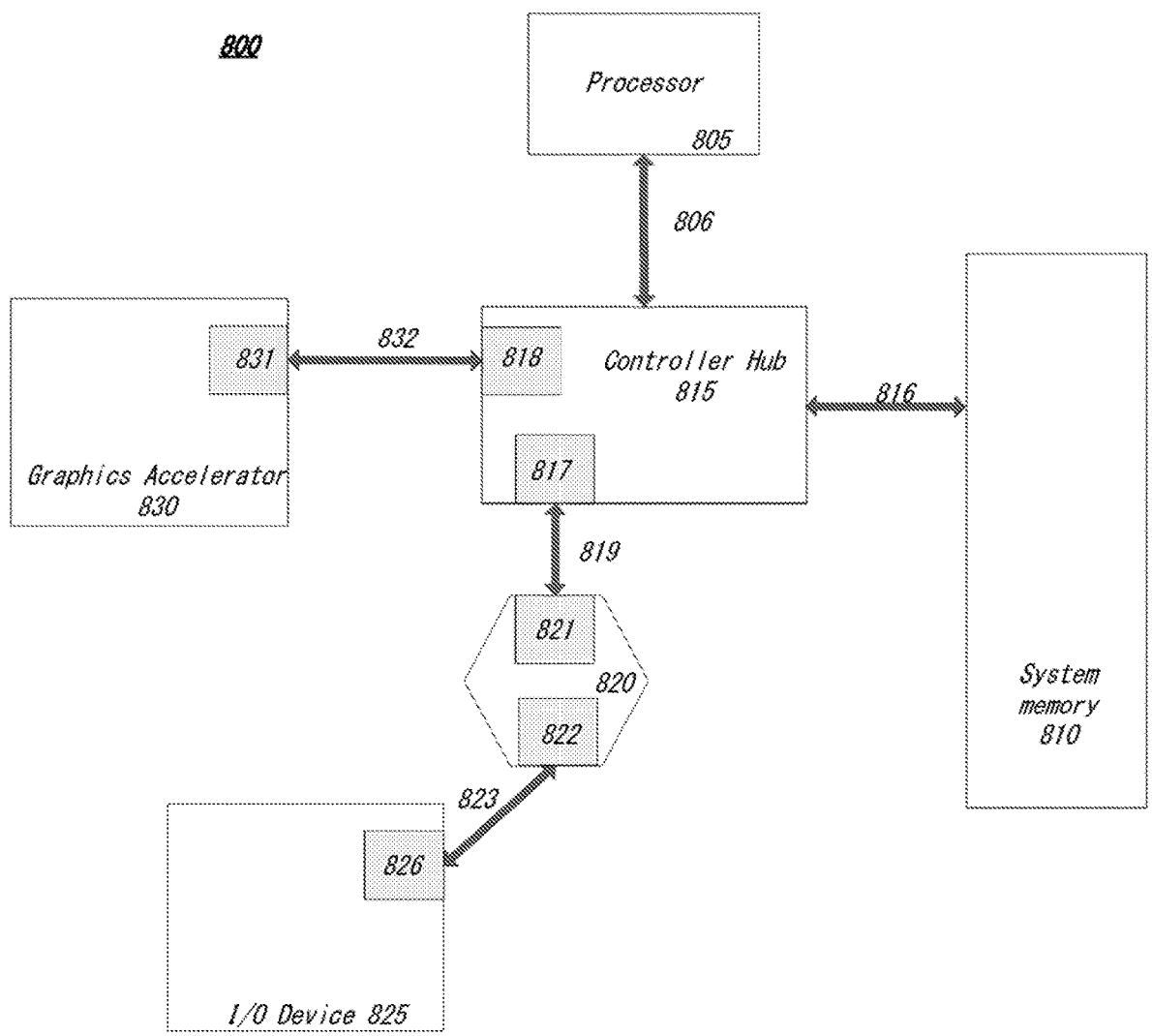
FIG. 8 illustrates an embodiment of a computing system including an interconnect architecture.

Referring to FIG. 8, an embodiment of a fabric composed of point-to-point Links that interconnect a set of components is illustrated. System 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standard.

System memory 810 includes any memory device, such as random access memory (RAM), non-volatile (NV) memory, or other memory accessible by devices in system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a Peripheral Component Interconnect Express (PCIe or PCIE) interconnection hierarchy. Examples of controller hub 815 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 805, while controller 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which may also be referred to as interfaces/ports 817 and 821, include/implement a layered protocol stack to provide communication between controller hub 815 and switch 820. In one embodiment, multiple devices are capable of being coupled to switch 820.

Switch/bridge 820 routes packets/messages from device 825 upstream, i.e. up a hierarchy towards a root complex, to controller hub 815 and downstream, i.e. down a hierarchy away from a root controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 825 may include a PCIe to PCI/PCI-X bridge to support legacy or other version PCI devices. Endpoint devices in PCIe are often classified as legacy, PCIe, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself may be integrated in processor 805.

Figure 9:
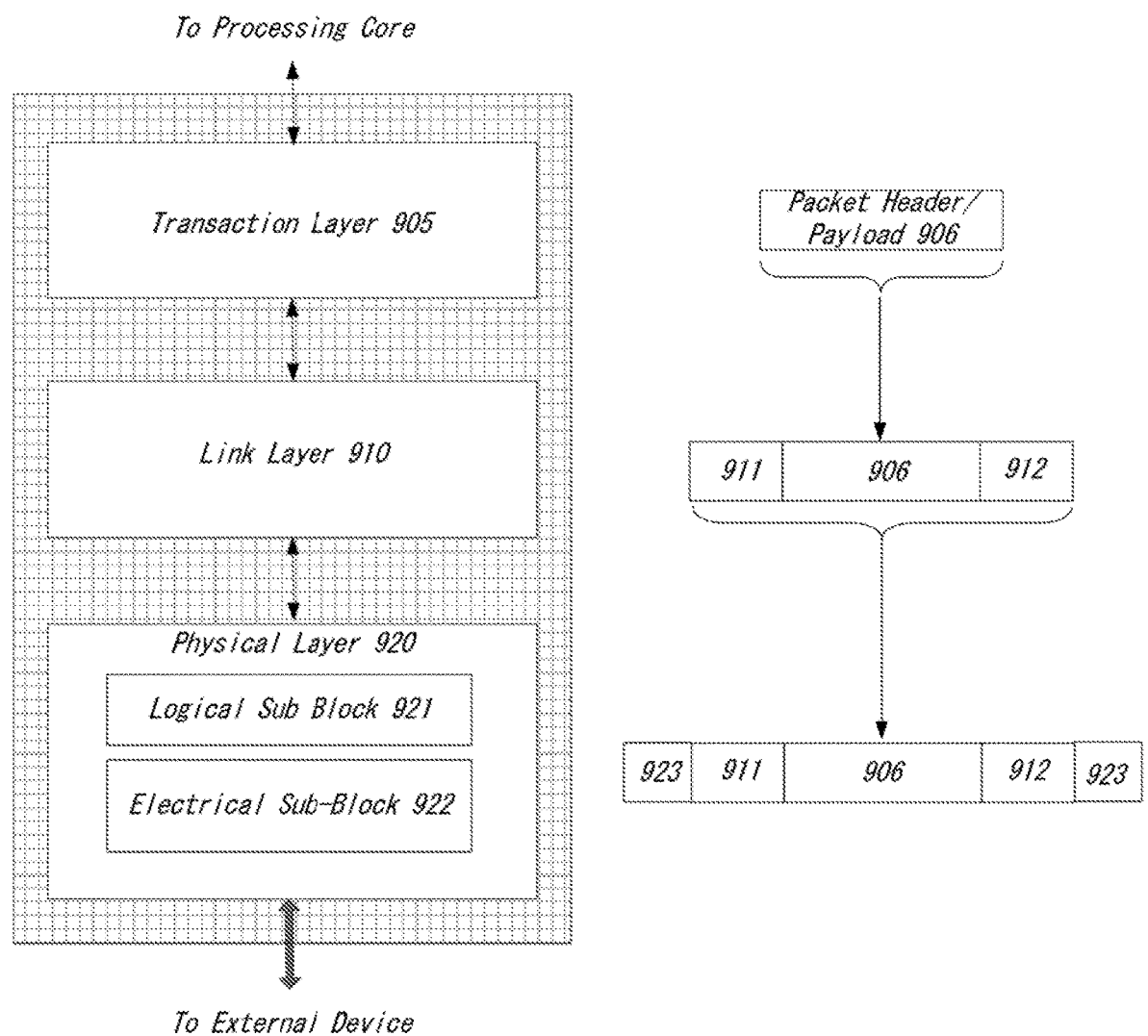
FIG. 9 illustrates an embodiment of a interconnect architecture including a layered stack.

Turning to FIG. 9 an embodiment of a layered protocol stack is illustrated. Layered protocol stack 900 includes any form of a layered communication stack, such as a Quick Path Interconnect (QPI) stack, a PCie stack, a next generation high performance computing interconnect stack, or other layered stack. Although the discussion immediately below in reference to FIG. 8-11 are in relation to a PCIe stack, the same concepts may be applied to other interconnect stacks. In one embodiment, protocol stack 900 is a PCIe protocol stack including transaction layer 905, link layer 910, and physical layer 920. An interface, such as interfaces 817, 818, 821, 822, 826, and 831 in FIG. 1, may be represented as communication protocol stack 900. Representation as a communication protocol stack may also be referred to as a module or interface implementing/including a protocol stack.

PCI Express uses packets to communicate information between components. Packets are formed in the Transaction Layer 905 and Data Link Layer 910 to carry the information from the transmitting component to the receiving component. As the transmitted packets flow through the other layers, they are extended with additional information necessary to handle packets at those layers. At the receiving side the reverse process occurs and packets get transformed from their Physical Layer 920 representation to the Data Link Layer 910 representation and finally (for Transaction Layer Packets) to the form that can be processed by the Transaction Layer 905 of the receiving device.

Transaction Layer

In one embodiment, transaction layer 905 is to provide an interface between a device's processing core and the interconnect architecture, such as data link layer 910 and physical layer 920. In this regard, a primary responsibility of the transaction layer 905 is the assembly and disassembly of packets (i.e., transaction layer packets, or TLPs). The translation layer 905 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 905. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 905 assembles packet header/payload 906. Format for current packet headers/payloads may be found in the PCIe specification at the PCIe specification website.

Figure 10:
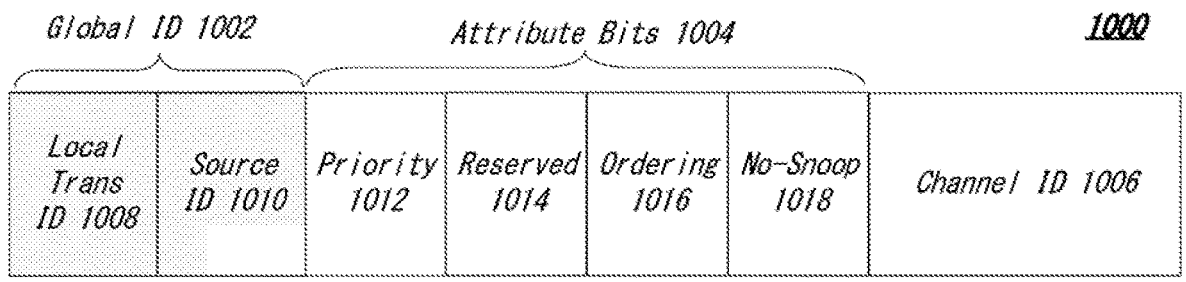
FIG. 10 illustrates an embodiment of a request or packet to be generated or received within an interconnect architecture.

Quickly referring to FIG. 10, an embodiment of a PCIe transaction descriptor is illustrated. In one embodiment, transaction descriptor 1000 is a mechanism for carrying transaction information. In this regard, transaction descriptor 1000 supports identification of transactions in a system. Other potential uses include tracking modifications of default transaction ordering and association of transaction with channels.

Transaction descriptor 1000 includes global identifier field 1002, attributes field 1004 and channel identifier field 1006. In the illustrated example, global identifier field 1002 is depicted comprising local transaction identifier field 1008 and source identifier field 1010. In one embodiment, global transaction identifier 1002 is unique for all outstanding requests.

According to one implementation, local transaction identifier field 1008 is a field generated by a requesting agent, and it is unique for all outstanding requests that require a completion for that requesting agent. Furthermore, in this example, source identifier 1010 uniquely identifies the requestor agent within a PCIe hierarchy. Accordingly, together with source ID 1010, local transaction identifier 1008 field provides global identification of a transaction within a hierarchy domain.

Attributes field 1004 specifies characteristics and relationships of the transaction. In this regard, attributes field 1004 is potentially used to provide additional information that allows modification of the default handling of transactions. In one embodiment, attributes field 1004 includes priority field 1012, reserved field 1014, ordering field 1016, and no-snoop field 1018. Here, priority sub-field 1012 may be modified by an initiator to assign a priority to the transaction. Reserved attribute field 1014 is left reserved for future, or vendor-defined usage. Possible usage models using priority or security attributes may be implemented using the reserved attribute field.

In this example, ordering attribute field 1016 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1018 is utilized to determine if transactions are snooped. As shown, channel ID Field 1006 identifies a channel that a transaction is associated with.

Link Layer

Link layer 910, also referred to as data link layer 910, acts as an intermediate stage between transaction layer 905 and the physical layer 920. In one embodiment, a responsibility of the data link layer 910 is providing a reliable mechanism for exchanging Transaction Layer Packets (TLPs) between two components a link. One side of the Data Link Layer 910 accepts TLPs assembled by the Transaction Layer 905, applies packet sequence identifier 911, i.e. an identification number or packet number, calculates and applies an error detection code, i.e. CRC 912, and submits the modified TLPs to the Physical Layer 920 for transmission across a physical to an external device.

Physical Layer

In one embodiment, physical layer 920 includes logical sub block 921 and electrical sub-block 922 to physically transmit a packet to an external device. Here, logical sub-block 921 is responsible for the "digital" functions of Physical Layer 921. In this regard, the logical sub-block includes a transmit section to prepare outgoing information for transmission by physical sub-block 922, and a receiver section to identify and prepare received information before passing it to the Link Layer 910.

Physical block 922 includes a transmitter and a receiver. The transmitter is supplied by logical sub-block 921 with symbols, which the transmitter serializes and transmits onto to an external device. The receiver is supplied with serialized symbols from an external device and transforms the received signals into a bit-stream. The bit-stream is de-serialized and supplied to logical sub-block 921. In one embodiment, an 8b/10b transmission code is employed, where ten-bit symbols are transmitted/received. Here, special symbols are used to frame a packet with frames 923. In addition, in one example, the receiver also provides a symbol clock recovered from the incoming serial stream.

As stated above, although transaction layer 905, link layer 910, and physical layer 920 are discussed in reference to a specific embodiment of a PCIe protocol stack, a layered protocol stack is not so limited. In fact, any layered protocol may be included/implemented. As an example, an port/ interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 11:
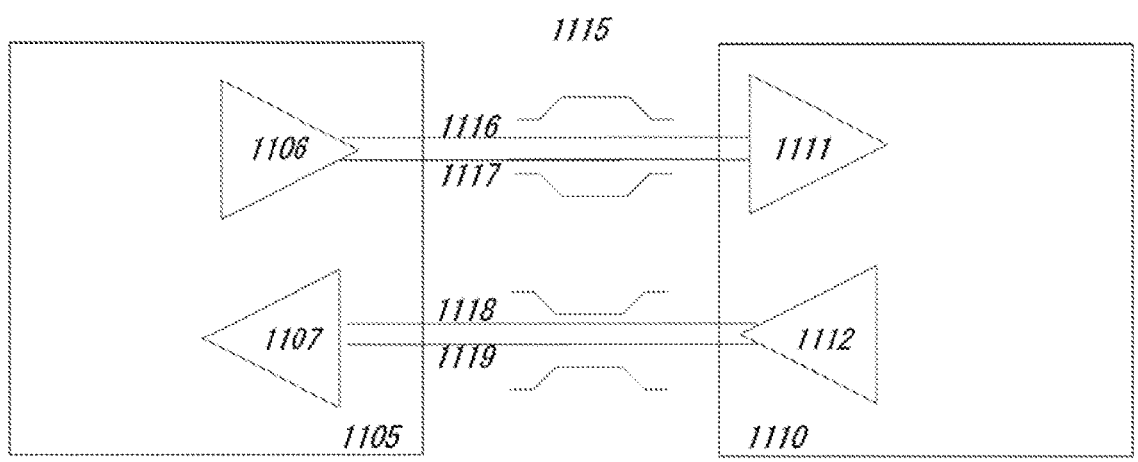
FIG. 11 illustrates an embodiment of a transmitter and receiver pair for an interconnect architecture.

Referring next to FIG. 11, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1106/1111 and a receive pair 1112/1107. Accordingly, device 1105 includes transmission logic 1106 to transmit data to device 1110 and receiving logic 1107 to receive data from device 1110. In other words, two transmitting paths, i.e. paths 1116 and 1117, and two receiving paths, i.e. paths 1118 and 1119, are included in a PCIe link.

A transmission path refers to any path for transmitting data, such as a transmission line, a copper line, an optical line, a wireless communication channel, an infrared communication link, or other communication path. A connection between two devices, such as device 1105 and device 1110, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Figure 12:
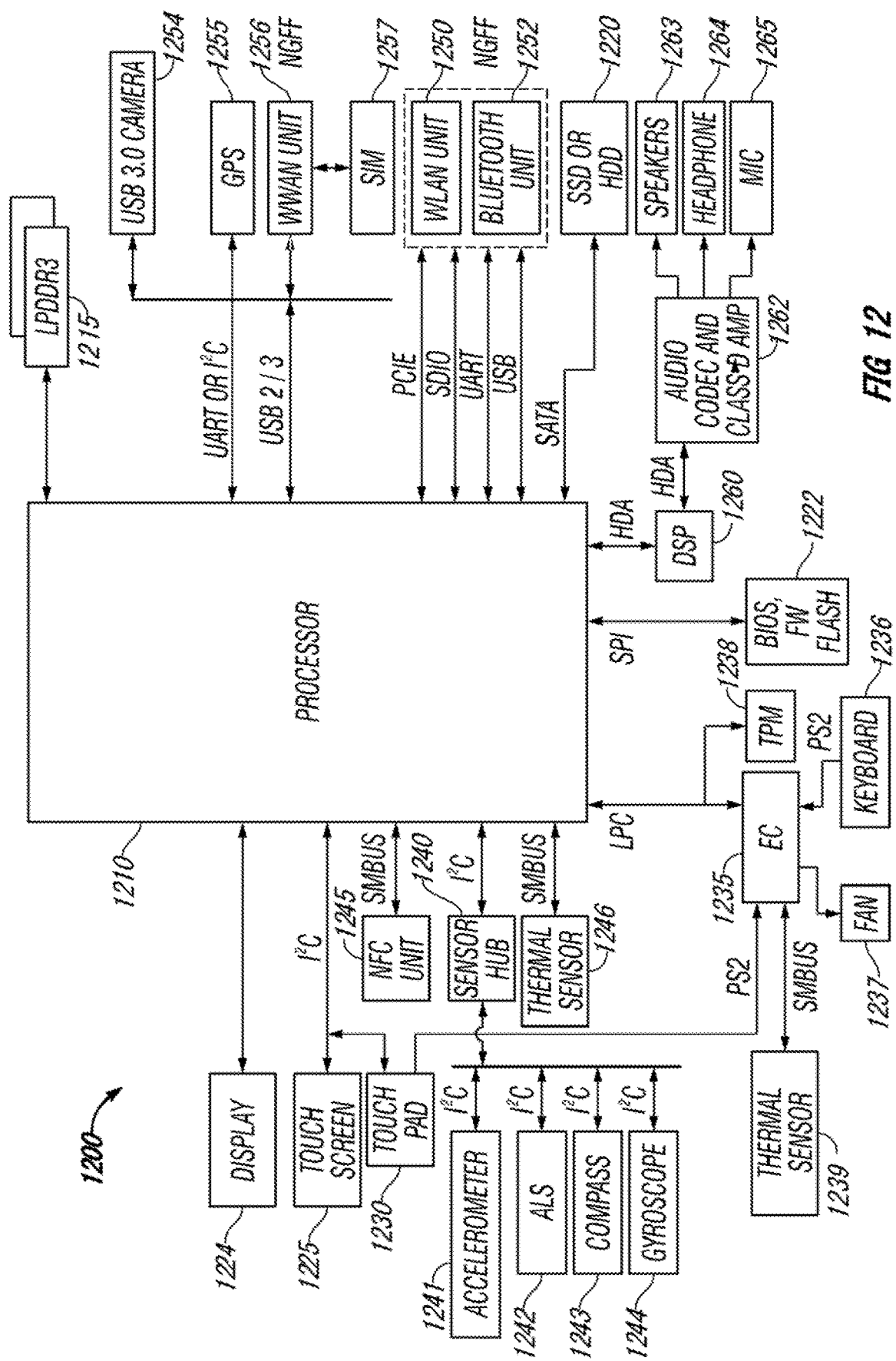
FIG. 12 illustrates an embodiment of a block for a computing system including multiple processor sockets.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is a method for controlling power management request responses, the method comprising receiving, at a downstream port of a root port controller compliant with a Peripheral Component Interconnect Express (PCIe) protocol, from an upstream switch port, a first power management entry request; rejecting the first power management entry request; transmitting a negative acknowledgement message to the upstream switch port; initiating a timer for at least 20 microseconds; during the 20 microseconds, ignoring any power management entry requests received from the upstream switch port; receiving, after the expiration of the 20 microseconds, a subsequent power management entry request; accepting the subsequent power management entry request; and transmitting an acknowledgement of the acceptance of the subsequent power management entry request to the upstream switch port.

Example 2 may include the subject matter of example 1, wherein the first power management request is an active state power management (ASPM) L1 entry request.

Example 3 may include the subject matter of example 2, wherein the upstream port is in an ASPM L0 power management state prior to receiving the ASPM L1 entry request.

Example 4 may include the subject matter of any of examples 1-3, wherein the power management entry request is received from an upstream switch port of a Thunderbolt device across a converged input/output link.

Example 5 may include the subject matter of any of examples 1-3, wherein the power management entry request is received from a Thunderbolt device at an integrated Thunderbolt host controller integrated with the downstream port.

Example 6 may include the subject matter of example 5, wherein the power management entry request is received across a Thunderbolt PHY Interface for a PCIe (TBT PIPE) link.

Example 7 may include the subject matter of any of examples 1-6, wherein the power management entry request comprises a PM_Active_State_Request_L1 data link layer packet (DLLP).

Example 8 may include the subject matter of any of examples 1-7, wherein the negative acknowledgement message to the upstream switch port comprises a PM_Active_State_Nack transaction layer packet (TLP).

Example 9 may include the subject matter of any of examples 1-8, wherein the acknowledgement message to the upstream switch port comprises a PM_Enter_Ack packet.

Example 10 may include the subject matter of any of examples 1-9, wherein ignoring any power management entry requests received from the upstream switch port comprises dropping one or more PM_Active_State_Request_L1 data link layer packets received while the 20 microseconds is counting down to zero.

Example 11 is a computing system comprising a root port controller compliant with a Peripheral Component Interconnect Express (PCIe) protocol, the root port comprising a downstream port; a Thunderbolt (TBT) host controller integrated into the computing system and local to the root port controller; the TBT host controller comprising a PCIe adapter coupled a downstream port of the root port controller by a Thunderbolt PHY Interface for a PCIe (TBT PIPE) link; the downstream port comprising logic implemented at least partially in hardware, the logic to receive, at a downstream port of a root port controller compliant with a Peripheral Component Interconnect Express (PCIe) protocol, from an upstream switch port, a first power management entry request; reject the first power management entry request; transmit a negative acknowledgement message to the upstream switch port; initiate a timer for at least 20 microseconds; during the 20 microseconds, ignore any power management entry requests received from the upstream switch port; receive, after the expiration of the 20 microseconds, a subsequent power management entry request; accept the subsequent power management entry request; and transmit an acknowledgement of the acceptance of the subsequent power management entry request to the upstream switch port.

Example 12 may include the subject matter of example 11, wherein the first power management request is an active state power management (ASPM) L1 entry request.

Example 13 may include the subject matter of example 12, wherein the upstream port is in an ASPM L0 power management state prior to receiving the ASPM L1 entry request.

Example 14 may include the subject matter of any of examples 11-13, wherein the power management entry request is received from an upstream switch port of a Thunderbolt device across a converged input/output link.

Example 15 may include the subject matter of any of examples 11-14, wherein the power management entry request is received from a Thunderbolt device at an integrated Thunderbolt host controller integrated with the downstream port.

Example 16 may include the subject matter of example 15, wherein the power management entry request is received across a Thunderbolt PHY Interface for a PCIe (TBT PIPE) link.

Example 17 may include the subject matter of any of examples 11-16, wherein the power management entry request comprises a PM_Active_State_Request_L1 data link layer packet (DLLP).

Example 18 may include the subject matter of any of examples 11-17, wherein the negative acknowledgement message to the upstream switch port comprises a PM_Active_State_Nack transaction layer packet (TLP).

Example 19 may include the subject matter of any of examples 11-18, wherein the acknowledgement message to the upstream switch port comprises a PM_Enter_Ack packet.

Example 20 may include the subject matter of any of examples 11-19, wherein ignoring any power management entry requests received from the upstream switch port comprises dropping one or more PM_Active_State_Request_L1 data link layer packets received while the 20 microseconds is counting down to zero.

Example 21 is a computer program product tangibly embodied on non-transitory computer-readable media, the computer program product comprising code that when executed cause logic embodied on a root port controller compliant with a Peripheral Component Interconnect Express (PCIe) protocol to receive, at a downstream port of a root port controller compliant with a Peripheral Component Interconnect Express (PCIe) protocol, from an upstream switch port, a first power management entry request; reject the first power management entry request; transmit a negative acknowledgement message to the upstream switch port; initiate a timer for at least 20 microseconds; during the 20 microseconds, ignore any power management entry requests received from the upstream switch port; receive, after the expiration of the 20 microseconds, a subsequent power management entry request; accept the subsequent power management entry request; and transmit an acknowledgement of the acceptance of the subsequent power management entry request to the upstream switch port.

Example 22 may include the subject matter of example 21, wherein the first power management request is an active state power management (ASPM) L1 entry request.

Example 23 may include the subject matter of example 22, wherein the upstream port is in an ASPM L0 power management state prior to receiving the ASPM L1 entry request.

Example 24 may include the subject matter of example 21-23, wherein the power management entry request is received from an upstream switch port of a Thunderbolt device across a converged input/output link.

Example 25 may include the subject matter of any of examples 21-24, wherein the power management entry request is received from a Thunderbolt device at an integrated Thunderbolt host controller integrated with the downstream port.

Example 26 may include the subject matter of example 25, wherein the power management entry request is received across a Thunderbolt PHY Interface for a PCIe (TBT PIPE) link.

Example 27 may include the subject matter of any of examples 21-26, wherein the power management entry request comprises a PM_Active_State_Request_L1 data link layer packet (DLLP).

Example 28 may include the subject matter of any of examples 21-27, wherein the negative acknowledgement message to the upstream switch port comprises a PM_Active_State_Nack transaction layer packet (TLP).

Example 29 may include the subject matter of any of examples 21-28, wherein the acknowledgement message to the upstream switch port comprises a PM_Enter_Ack packet.

Example 30 may include the subject matter of any of examples 21-29, wherein ignoring any power management entry requests received from the upstream switch port comprises dropping one or more PM_Active_State_Request_L1 data link layer packets received while the 20 microseconds is counting down to zero.

Example 31 is a method for transmitting power management entry requests from an upstream switch port, the method comprising transmitting a first power management entry request to a downstream port of a root port controller compliant with a Peripheral Component Interconnect Express (PCIe) protocol; receiving a negative acknowledgement from the downstream port; initiating a timer for at least 30 microseconds; and after the expiration of the 30 microseconds, transmitting a subsequent power management entry request to the downstream port.

Example 32 may include the subject matter of example 31, wherein the first power management request is an active state power management (ASPM) L1 entry request.

Example 33 may include the subject matter of example 32, wherein the upstream port is in an ASPM L0 power management state prior to receiving the ASPM L1 entry request.

Example 34 may include the subject matter of any of examples 31-33, wherein the power management entry request is transmitted from the upstream switch port of a Thunderbolt device across a converged input/output link.

Example 35 may include the subject matter of any of examples 31-34, wherein the power management entry request is transmitted to a Thunderbolt device at an integrated Thunderbolt host controller integrated with the downstream port.

Example 36 may include the subject matter of example 35, wherein the power management entry request is transmitted across a Thunderbolt PHY Interface for a PCIe (TBT PIPE) link.

Example 37 may include the subject matter of any of examples 31-36, wherein the power management entry request comprises a PM_Active_State_Request_L1 data link layer packet (DLLP).

Example 38 may include the subject matter of any of examples 31-37, wherein the negative acknowledgement message comprises a PM_Active_State_Nack transaction layer packet (TLP).

Example 39 may include the subject matter of any of examples 31-38, wherein the acknowledgement message comprises a PM_Enter_Ack packet.

Example 40 may include the subject matter of any of examples 31-29, wherein ignoring any power management entry requests received from the upstream switch port comprises dropping one or more PM_Active_State_Request_L1 data link layer packets received while the 20 microseconds is counting down to zero.

Example 41 is a computing system comprising a root port controller compliant with a Peripheral Component Interconnect Express (PCIe) protocol, the root port comprising a downstream port; a Thunderbolt (TBT) host controller integrated into the computing system and local to the root port controller; the TBT host controller comprising a PCIe adapter coupled a downstream port of the root port controller by a Thunderbolt PHY Interface for a PCIe (TBT PIPE) link; a TBT device comprising a PCIe upstream switch port; the PCIe upstream switch port comprising logic implemented at least partially in hardware, the logic to transmit a first power management entry request to a downstream port of a root port controller compliant with a Peripheral Component Interconnect Express (PCIe) protocol; receive a negative acknowledgement from the downstream port; initiate a timer for at least 30 microseconds; and after the expiration of the 30 microseconds, transmit a subsequent power management entry request to the downstream port.

Example 42 may include the subject matter of example 41, wherein the first power management request is an active state power management (ASPM) L1 entry request.

Example 43 may include the subject matter of example 42, wherein the PCIe upstream switch port is in an ASPM L0 power management state prior to receiving the ASPM L1 entry request.

Example 44 may include the subject matter of any of examples 41-43, wherein the power management entry request is transmitted from the upstream switch port of a Thunderbolt device across a converged input/output link.

Example 45 may include the subject matter of any of examples 41-44, wherein the power management entry request is transmitted to a Thunderbolt device at an integrated Thunderbolt host controller integrated with the downstream port.

Example 46 may include the subject matter of example 45, wherein the power management entry request is transmitted across a Thunderbolt PHY Interface for a PCIe (TBT PIPE) link.

Example 47 may include the subject matter of any of examples 41-46, wherein the power management entry request comprises a PM_Active_State_Request_L1 data link layer packet (DLLP).

Example 48 may include the subject matter of any of examples 41-47, wherein the negative acknowledgement message comprises a PM_Active_State_Nack transaction layer packet (TLP).

Example 49 may include the subject matter of any of examples 41-48, wherein the acknowledgement message comprises a PM_Enter_Ack packet.

Example 50 may include the subject matter of any of examples 41-49, wherein ignoring any power management entry requests received from the upstream switch port comprises dropping one or more PM_Active_State_Request_L1 data link layer packets received while the 20 microseconds is counting down to zero.

Example 51 is a computer program product tangibly embodied on non-transitory computer-readable media, the computer program product comprising code that when executed cause logic embodied on a upstream switch port compliant with a Peripheral Component Interconnect Express (PCIe) protocol to transmit a first power management entry request to a downstream port of a root port controller compliant with a Peripheral Component Interconnect Express (PCIe) protocol; receive a negative acknowledgement from the downstream port; initiate a timer for at least 30 microseconds; and after the expiration of the 30 microseconds, transmit a subsequent power management entry request to the downstream port.

Example 52 may include the subject matter of example 51, wherein the first power management request is an active state power management (ASPM) L1 entry request.

Example 53 may include the subject matter of example 52, wherein the PCIe upstream switch port is in an ASPM L0 power management state prior to receiving the ASPM L1 entry request.

Example 54 may include the subject matter of any of examples 51-53, wherein the power management entry request is transmitted from the upstream switch port of a Thunderbolt device across a converged input/output link.

Example 55 may include the subject matter of any of examples 51-54, wherein the power management entry request is transmitted to a Thunderbolt device at an integrated Thunderbolt host controller integrated with the downstream port.

Example 56 may include the subject matter of example 55, wherein the power management entry request is transmitted across a Thunderbolt PHY Interface for a PCIe (TBT PIPE) link.

Example 57 may include the subject matter of any of examples 51-56, wherein the power management entry request comprises a PM_Active_State_Request_L1 data link layer packet (DLLP).

Example 58 may include the subject matter of any of examples 51-57, wherein the negative acknowledgement message comprises a PM_Active_State_Nack transaction layer packet (TLP).

Example 59 may include the subject matter of any of examples 51-58, wherein the acknowledgement message comprises a PM_Enter_Ack packet.

Example 60 may include the subject matter of any of examples 51-59, wherein ignoring any power management entry requests received from the upstream switch port comprises dropping one or more PM_Active_State_Request_L1 data link layer packets received while the 20 microseconds is counting down to zero.

Example 61 is a method performed at a upstream component compliant with a Peripheral Component Interconnect Express (PCIe) protocol, the method comprising transmitting a transaction layer packet (TLP) to a Thunderbolt (TBT) PCIe adapter element at an integrated TBT host controller local to the upstream component; receiving from the TBT PCIe adapter element a halt indication signal; and pausing a replay timer associated with transmissions of TLPs from an upstream component data link layer.

Example 62 may include the subject matter of example 61, further comprising, ceasing transmissions of TLP from the upstream component on receiving the halt indication signal from the PCIe adapter element.

Example 63 may include the subject matter of any of examples 61-62, further comprising, rejecting new TLPs incoming to the upstream component data link layer from a transaction layer of the upstream component.

Example 64 may include the subject matter of any of examples 61, further comprising receiving a de-assertion of the halt indication signal from the PCIe adapter; and resuming the replay timer based on receiving the de-assertion of the halt indication signal.

Example 65 may include the subject matter of example 64, further comprising resuming receiving TLP from the transaction layer; and resuming transmission of TLP to the PCIe adapter element of the TBT host controller.

Example 66 may include the subject matter of any of examples 61-65, wherein the halt indication signal is received across a TBT PHY Interface for a PCIe (PIPE) link.

Example 67 is a computing system comprising an upstream component data link layer, the upstream component data link layer compliant with a Peripheral Component Interconnect Express (PCIe) protocol, the upstream component data link layer comprising a replay timer; a transaction layer packet buffer; and transmission logic; an integrated Thunderbolt (TBT) host controller comprising: a PCIe adapter element; and a transmit queue; and a halt indication logic; the upstream component data link layer comprising logic to transmit a transaction layer packet (TLP) to a Thunderbolt (TBT) PCIe adapter element at an integrated TBT host controller local to the upstream component; receive from the TBT PCIe adapter element a halt indication signal; and pause a replay timer associated with transmissions of TLPs from an upstream component data link layer.

Example 68 may include the subject matter of example 67, the upstream component data link layer comprising logic to cease transmissions of TLP from the upstream component on receiving the halt indication signal from the PCIe adapter element.

Example 69 may include the subject matter of any of examples 67-68, the upstream component data link layer comprising logic to reject new TLPs incoming to the upstream component data link layer from a transaction layer of the upstream component.

Example 70 may include the subject matter of any of examples 67-69, the upstream component data link layer comprising logic to receive a de-assertion of the halt indication signal from the PCIe adapter; and resume the replay timer based on receiving the de-assertion of the halt indication signal.

Example 71 may include the subject matter of example 70, the upstream component data link layer comprising logic to resume receiving TLP from the transaction layer; and resume transmission of TLP to the PCIe adapter element of the TBT host controller.

Example 72 may include the subject matter of any of examples 67-71, wherein the halt indication signal is received across a TBT PHY Interface for a PCIe (PIPE) link.

Example 73 may include the subject matter of any of examples 67-72, the PCIe adapter element comprising logic to determine that the transmit queue is full or nearly full; and transmit the halt indication signal to the upstream component data link layer based on the determination that the transmit queue is full or nearly full.

Example 74 may include the subject matter of example 73, wherein determining that the transmit queue is full or nearly full comprises determining that the transmit queue comprises a number of TLPs that exceed a threshold number of TLPs.

Example 75 may include the subject matter of example 73, wherein determining that the transmit queue is full or nearly full comprises determining that the transmit queue comprises an amount of data that exceeds a threshold amount of data.

Example 76 may include the subject matter of example 73, wherein transmitting the halt indication comprises transmitting the halt indication across a TBT PHY Interface for a PCIe (PIPE) link.

Example 78 may include the subject matter of example 73, the PCIe adapter element comprising logic to determine that the transmit queue comprises a number of TLP below a threshold level; and de-assert the halt indication signal.

Example 79 is a computer program product tangibly embodied on non-transitory computer-readable media, the computer program product comprising code that when executed cause logic embodied on a root port controller compliant with a Peripheral Component Interconnect Express (PCIe) protocol to transmit a transaction layer packet (TLP) to a Thunderbolt (TBT) PCIe adapter element at an integrated TBT host controller local to the upstream component; receive from the TBT PCIe adapter element a halt indication signal; and pause a replay timer associated with transmissions of TLPs from an upstream component data link layer.

80 may include the subject matter of example 79, wherein the code, when executed, causes the root port controller to cease transmissions of TLP from the upstream component on receiving the halt indication signal from the PCIe adapter element.

Example 81 may include the subject matter of any of examples 79-80, wherein the code, when executed, causes the root port controller to reject new TLPs incoming to the upstream component data link layer from a transaction layer of the upstream component.

Example 82 may include the subject matter of any of examples 79-81, wherein the code, when executed, causes the root port controller to receive a de-assertion of the halt indication signal from the PCIe adapter; and resume the replay timer based on receiving the de-assertion of the halt indication signal.

Example 83 may include the subject matter of example 82, wherein the code, when executed, causes the root port controller to resume receiving TLP from the transaction layer; and resume transmission of TLP to the PCIe adapter element of the TBT host controller.

Example 84 may include the subject matter of any of examples 79-83, wherein the halt indication signal is received across a TBT PHY Interface for a PCIe (PIPE) link.

Example 85 is a computer program product tangibly embodied on non-transitory computer-readable media, the computer program product comprising code that when executed cause logic embodied on a Peripheral Component Interconnect Express (PCIe) adapter element on an integrated Thunderbolt host controller to determine that the transmit queue is full or nearly full; and transmit the halt indication signal to the upstream component data link layer based on the determination that the transmit queue is full or nearly full.

Example 86 may include the subject matter of example 85, wherein determining that the transmit queue is full or nearly full comprises determining that the transmit queue comprises a number of TLPs that exceed a threshold number of TLPs.

Example 87 may include the subject matter of example 85, wherein determining that the transmit queue is full or nearly full comprises determining that the transmit queue comprises an amount of data that exceeds a threshold amount of data.

Example 88. The computer program product of claim 85, wherein transmitting the halt indication comprises transmitting the halt indication across a TBT PHY Interface for a PCIe (PIPE) link.

Example 89 may include the subject matter of example 85, wherein the code, when executed, causes the PCIe adapter to determine that the transmit queue comprises a number of TLP below a threshold level; and de-assert the halt indication signal.

Example 90 is a method comprising determining that the transmit queue is full or nearly full; and transmitting the halt indication signal to the upstream component data link layer based on the determination that the transmit queue is full or nearly full.

Example 91 may include the subject matter of example 90, wherein determining that the transmit queue is full or nearly full comprises determining that the transmit queue comprises a number of TLPs that exceed a threshold number of TLPs.

Example 92 may include the subject matter of example 90, wherein determining that the transmit queue is full or nearly full comprises determining that the transmit queue comprises an amount of data that exceeds a threshold amount of data.

Example 93 may include the subject matter of example 90, wherein transmitting the halt indication comprises transmitting the halt indication across a TBT PHY Interface for a PCIe (PIPE) link.

Example 94 may include the subject matter of example 90, further comprising determine that the transmit queue comprises a number of TLP below a threshold level; and de-assert the halt indication signal.

What is claimed is:

1. A method for controlling power management request responses, the method comprising:
receiving, at a downstream port of a root port controller compliant with a Peripheral Component Interconnect Express (PCIe) protocol, from an upstream switch port, a first power management entry request;
rejecting the first power management entry request;
transmitting a negative acknowledgement message to the upstream switch port;
initiating a timer for at least 20 microseconds;
during the 20 microseconds, ignoring any power management entry requests received from the upstream switch port;
receiving, after the expiration of the 20 microseconds, a subsequent power management entry request;
accepting the subsequent power management entry request; and transmitting an acknowledgement of the acceptance of the subsequent power management entry request to the upstream switch port.

2. The method of claim 1, wherein the first power management request is an active state power management (ASPM) L1 entry request.

3. The method of claim 2, wherein the upstream port is in an ASPM L0 power management state prior to receiving the ASPM L1 entry request.

4. The method of claim 1, wherein the power management entry request is received from an upstream switch port of a Thunderbolt device across a converged input/output link.

5. The method of claim 1, wherein the power management entry request is received from a Thunderbolt device at an integrated Thunderbolt host controller integrated with the downstream port.

6. The method of claim 5, wherein the power management entry request is received across a Thunderbolt PHY Interface for a PCIe (TBT PIPE) link.

7. The method of claim 1, wherein the power management entry request comprises a PM_Active_State_Request_L1 data link layer packet (DLLP).

8. The method of claim 1, wherein the negative acknowledgement message to the upstream switch port comprises a PM_Active_State_Nack transaction layer packet (TLP).

9. The method of claim 1, wherein the acknowledgement message to the upstream switch port comprises a PM_Enter_Ack packet.

10. The method of claim 1, wherein ignoring any power management entry requests received from the upstream switch port comprises dropping one or more PM_Active_State_Request_L1 data link layer packets received while the 20 microseconds is counting down to zero.

11. A computing system comprising:
a root port controller compliant with a Peripheral Component Interconnect Express (PCIe) protocol, the root port comprising a downstream port;
a Thunderbolt (TBT) host controller integrated into the computing system and local to the root port controller;
the TBT host controller comprising a PCIe adapter coupled a downstream port of the root port controller by a Thunderbolt PHY Interface for a PCIe (TBT PIPE) link;
the downstream port comprising logic implemented at least partially in hardware, the logic to:
receive, at a downstream port of a root port controller compliant with a Peripheral Component Interconnect Express (PCIe) protocol, from an upstream switch port, a first power management entry request;
reject the first power management entry request;
transmit a negative acknowledgement message to the upstream switch port;
initiate a timer for at least 20 microseconds;
during the 20 microseconds, ignore any power management entry requests received from the upstream switch port;
receive, after the expiration of the 20 microseconds, a subsequent power management entry request;
accept the subsequent power management entry request; and
transmit an acknowledgement of the acceptance of the subsequent power management entry request to the upstream switch port.

12. The computing system of claim 11, wherein the first power management request is an active state power management (ASPM) L1 entry request.

13. The computing system of claim 12, wherein the upstream port is in an ASPM L0 power management state prior to receiving the ASPM L1 entry request.

14. The computing system of claim 11, wherein the power management entry request is received from an upstream switch port of a Thunderbolt device across a converged input/output link.

15. The computing system of claim 11, wherein the power management entry request is received from a Thunderbolt device at an integrated Thunderbolt host controller integrated with the downstream port.

16. The computing system of claim 15, wherein the power management entry request is received across a Thunderbolt PHY Interface for a PCIe (TBT PIPE) link.

17. The computing system of claim 11, wherein the power management entry request comprises a PM_Active_State_Request_L1 data link layer packet (DLLP).

18. The computing system of claim 11, wherein the negative acknowledgement message to the upstream switch port comprises a PM_Active_State_Nack transaction layer packet (TLP).

19. The computing system of claim 11, wherein the acknowledgement message to the upstream switch port comprises a PM_Enter_Ack packet.

20. The computing system of claim 11, wherein ignoring any power management entry requests received from the upstream switch port comprises dropping one or more PM_Active_State_Request_L1 data link layer packets received while the 20 microseconds is counting down to zero.

21. A computer program product tangibly embodied on non-transitory computer-readable media, the computer program product comprising code that when executed cause logic embodied on a root port controller compliant with the Peripheral Component Interconnect Express (PCIe) protocol to:
receive, at a downstream port of a root port controller compliant with a Peripheral Component Interconnect Express (PCIe) protocol, from an upstream switch port, a first power management entry request;
reject the first power management entry request;
transmit a negative acknowledgement message to the upstream switch port;
initiate a timer for at least 20 microseconds;
during the 20 microseconds, ignore any power management entry requests received from the upstream switch port;
receive, after the expiration of the 20 microseconds, a subsequent power management entry request;
accept the subsequent power management entry request; and
transmit an acknowledgement of the acceptance of the subsequent power management entry request to the upstream switch port.

22. The computer program product of claim 21, wherein the first power management request is an active state power management (ASPM) L1 entry request.

23. The computer program product of claim 22, wherein the upstream port is in an ASPM L0 power management state prior to receiving the ASPM L1 entry request.

24. The computer program product of claim 21, wherein the power management entry request is received from an upstream switch port of a Thunderbolt device across a converged input/output link.

25. The computer program product of claim 21, wherein the power management entry request is received from a Thunderbolt device at an integrated Thunderbolt host controller integrated with the downstream port.

\* \* \* \* \*